(12) United States Patent
Harasimiuk et al.

(10) Patent No.: US 9,712,481 B2
(45) Date of Patent: Jul. 18, 2017

(54) SOCIAL MEDIA FEEDBACK FOR ROUTING USER COMMUNICATIONS

(71) Applicant: Angel.com Incorporated, Vienna, VA (US)

(72) Inventors: Pawel Harasimiuk, Chantilly, VA (US); Aaron Wellman, Annandale, VA (US); Lindsay Frazier, Arlington, VA (US); Praphul Kumar, Falls Church, VA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 199 days.

(21) Appl. No.: 14/448,365

(22) Filed: Jul. 31, 2014

(65) Prior Publication Data
US 2016/0036973 A1    Feb. 4, 2016

(51) Int. Cl.
*H04M 3/00*    (2006.01)
*H04L 12/58*    (2006.01)
*H04M 3/51*    (2006.01)

(52) U.S. Cl.
CPC .......... *H04L 51/32* (2013.01); *H04M 3/5191* (2013.01); *H04M 2203/655* (2013.01)

(58) Field of Classification Search
CPC ............. H04M 3/5235; H04M 3/5233; H04M 3/5183; H04M 3/5175; H04M 3/523
USPC ............................ 379/265.01–265.02, 265.13
See application file for complete search history.

(56) References Cited

U.S. PATENT DOCUMENTS

| 8,761,377 | B2 | 6/2014 | Famous |
| 2013/0166457 | A1 | 6/2013 | Du et al. |
| 2014/0044246 | A1* | 2/2014 | Klemm ................ H04M 3/523 379/93.01 |

(Continued)

FOREIGN PATENT DOCUMENTS

KR    1020090000021 A    1/2009

OTHER PUBLICATIONS

AudienceIQ—Intelligent Audience Matching for Targeting your Sponsored Posts [online], [retrieved on Aug. 20, 2014]. Retrieved from the Internet: http://adly.com/aiq.html, 3 pages.

(Continued)

*Primary Examiner* — Rasha Al Aubaidi
(74) *Attorney, Agent, or Firm* — Lewis Roca Rothgerber Christie LLP

(57) ABSTRACT

A call handling platform receives a call placed by a caller to a calling number. The platform examines parameters of the call, determines identifying information of the caller and matches the identifying information with a social network username corresponding to a social media network. The platform obtains the caller's social network data from the social media network. Using the social network data, the platform computes a social network influence score for the caller. The platform compares the social network influence score to a predetermined influence score threshold value and determines that the social network influence score for the caller indicates that the activity of the caller in the social media network has a high level of impact. The platform accordingly selects a first human agent at a call center and routes the call to the first human agent at the call center.

16 Claims, 10 Drawing Sheets

(56) References Cited

U.S. PATENT DOCUMENTS

2014/0164502 A1    6/2014  Khodorenko et al.

OTHER PUBLICATIONS

How Social Engagement Translates to Sales, Jul. 23, 2014 [online], [retrieved on Aug. 20, 2014]. Retrieved from the Internet: http://adly.com/blog/engagementtosales/, 4 pages.
Adly Raises $2M More as It Expands Tools for Social Media Celebrity Endorsements, May 23, 2013 [online], [retrieved on Aug. 20, 2014]. Retrieved from the Internet: http://techcrunch.com/2013/05/23/adly-funding/, 2 pages.
IZEA Unveils the Sponsorship Marketplace for Brands, Agencies and Content Creators, Mar. 17, 2014 [online], [retrieved on Aug. 20, 2014]. Retrieved from the Internet: http://corp.izea.com/2014/03/17/izea-unveils-the-sponsorship-marketplace-for-brands-agen . . . , 4 pages.
Mark 'Rizzn' Hopkins, "Magpie: Make Money on Twitter", Oct. 30, 2008 [online], [retrieved on Aug. 20, 2014]. Retrieved from the Internet: http://mashable.com/2008/10/30/magpie/, 5 pages.
International Search Report and Written Opinion for Application No. PCT/US2015/042994, mailed Oct. 27, 2015, 12 pages.

\* cited by examiner

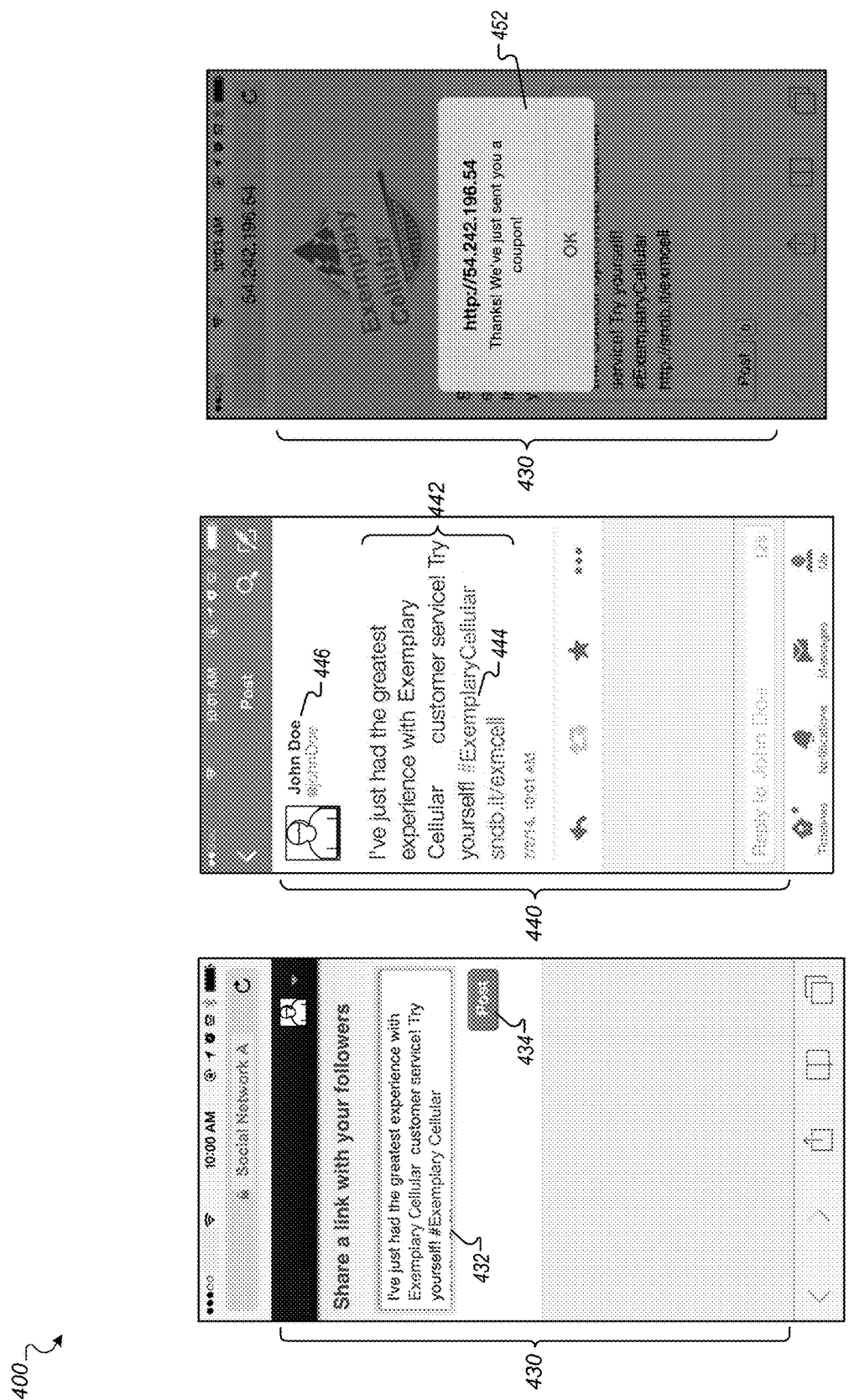

SOCIAL MEDIA FEEDBACK FOR ROUTING USER COMMUNICATIONS

TECHNICAL FIELD

This disclosure relates to routing user communications made to a contact handling platform based on social media feedback.

BACKGROUND

A user may use a personal communications device to contact a company to discuss a service or a product provided by the company. The user may contact the company by establishing electronic communications with the company through use of one or more of multiple different communications modes (e.g., phone, email, web chat, or Short Message Service (SMS) that support communications).

SUMMARY

In a general aspect, a call handling platform receives a call placed by a caller to a calling number. The call handling platform examines parameters of the call. Based on examining the parameters of the call, the call handling platform determines identifying information of the caller. The call handling platform matches the identifying information of the caller with a social network username corresponding to a social media network. The call handling platform obtains, from the social media network, social network data associated with the caller using the social network username. The call handling platform computes a social network influence score for the caller using the social network data, wherein the social network influence score reflects a numerical measure of a level of impact of activity of the caller in the social media network. The call handling platform accesses a predetermined influence score threshold value and compares the social network influence score to the influence score threshold value. The call handling platform determines, based on the comparing, that the social network influence score for the caller indicates that the activity of the caller in the social media network has a high level of impact. Conditioned on the determining, the call handling platform selects a first human agent at a call center and routes the call to the first human agent at the call center.

Particular implementations may include one or more of the following features. The call handling platform may obtain a list of human agents available at the call center for handling the call and may determine one or more characteristics of the human agents. The call handling platform may select the first human agent for routing the call based on the determined characteristics of the human agents and the social network influence score of the caller.

The call handling platform may determine that a human agent is not available at present to handle the call. In response to the determining, the call handling platform may place the call in a call waiting queue, wherein an order of calls placed in the call waiting queue may be based on social network influence scores of associated callers.

Computing the social network influence score for the caller using the social network data may comprise measuring values of one or more social network parameters by analyzing the social network data. The social network influence score may be computed based on the measured values of the one or more parameters. The one or more parameters may be configured by a content provider associated with the calling number using a graphical user interface (GUI) provided by the call handling platform. Weights may be assigned to the measured values of the one or more parameters. The weights may be configured by the content provider. The social network influence score may be computed based on the weighted values of the one or more parameters.

Receiving the call placed by the caller may comprise initially routing the call to an interactive voice response (IVR) module associated with the call handling platform. The call handling platform may collect data points based on an interaction of the caller with the IVR module during the call. The call handling platform may compute an experience score for the caller using the data points, wherein the experience score may reflect a numerical measure of a level of satisfaction of the caller in interacting with the IVR module during the call. The call handling platform may access a predetermined experience score threshold value that indicates a first level of caller satisfaction and may compare the experience score to the experience score threshold value. Conditioned on determining, based on the comparing, that the experience score for the caller indicates that the caller has a lower level of satisfaction than the first level of satisfaction, the call handling platform may decide to route the call to a human agent at the call center.

The call handling platform may determine whether an option for recording a call is enabled. Based on determining that the option for recording a call is enabled, the call handling platform may initiate recording of interaction between the caller and the first human agent. Determining that the social network influence score for the caller indicates that the activity of the caller in the social media network has a high level of impact may comprise determining that the social network influence score for the caller is greater than the influence score threshold value.

In another general aspect, a call handling platform receives a first call placed by a caller to a calling number. The call handling platform determines identifying information of the caller from parameters of the first call. The call handling platform determines that a social network username of the caller corresponding to a social media network is not known to the call handling platform. The call handling platform sends to the caller a first message requesting that the caller provide a feedback corresponding to the call on the social media network. The call handling platform receives from the caller a response indicating agreement by the caller to provide the feedback. Based on receiving the response indicating the agreement by the caller, the call handling platform prepares a feedback form with prepopulated content that includes tracking information associating the feedback form to the identifying information of the caller. The call handling platform sends to the caller a second message including information corresponding to the feedback form. The call handling platform receives from the social media network an acknowledgement message indicating that the caller has posted the feedback on the social media network. The acknowledgement message includes the social network username of the caller corresponding to the social media network and the tracking information. The call handling platform obtains the social network username of the caller and the tracking information from the acknowledgement message. The call handling platform retrieves the identifying information of the caller based on the tracking information obtained from the acknowledgement message. The call handling platform associates the identifying information of the caller with the social network username of the caller obtained from the acknowledgement message.

Particular implementations may include one or more of the following features. The first message may include an offer to reward the caller for providing the feedback. Based on associating the identifying information of the caller with the social network username of the caller, the call handling platform may send the reward to the caller for providing the feedback.

The call handling platform may receive a second call placed by the caller to the calling number. The call handling platform may determine the identifying information of the caller from parameters of the second call. The call handling platform may match the identifying information of the caller with the social network username of the caller obtained from the acknowledgement message. The call handling platform may obtain, from the social media network, social network data associated with the caller using the social network username. The call handling platform may compute a social network influence score for the caller using the social network data. The social network influence score may reflect a numerical measure of a level of impact of activity of the caller in the social media network. The call handling platform may access a predetermined influence score threshold value. The call handling platform may compare the social network influence score to the influence score threshold value. Conditioned on determining, by the call handling platform and based on the comparing, that the social network influence score for the caller indicates that the activity of the caller in the social media network has a high level of impact, the call handling platform may route the second call to a human agent at a call center.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above described actions. One such computer-readable medium stores instructions that, when executed by a processor, are configured to cause the processor to perform the above described actions.

One such system comprises a call handling platform that includes a processor and instructions stored in a machine-readable medium that, when executed by the processor, are configured to perform one or more of the above described actions. An IVR module is associated with the call handling platform.

Particular implementations may include one or more of the following features. A recording module that is associated with the call handling platform may perform recording of the interaction between the caller and the human agent. A speech analysis module associated with the call handling platform may analyze at least one of speech of the caller or the human agent during the interaction between the caller and the human agent.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 4A-4E illustrate examples of pages of a GUI that are shown to a customer for providing social media feedback about a customer communications session that is handled by a contact handling platform.

Like reference symbols in different figures indicate like elements.

DETAILED DESCRIPTION

Figure 1:
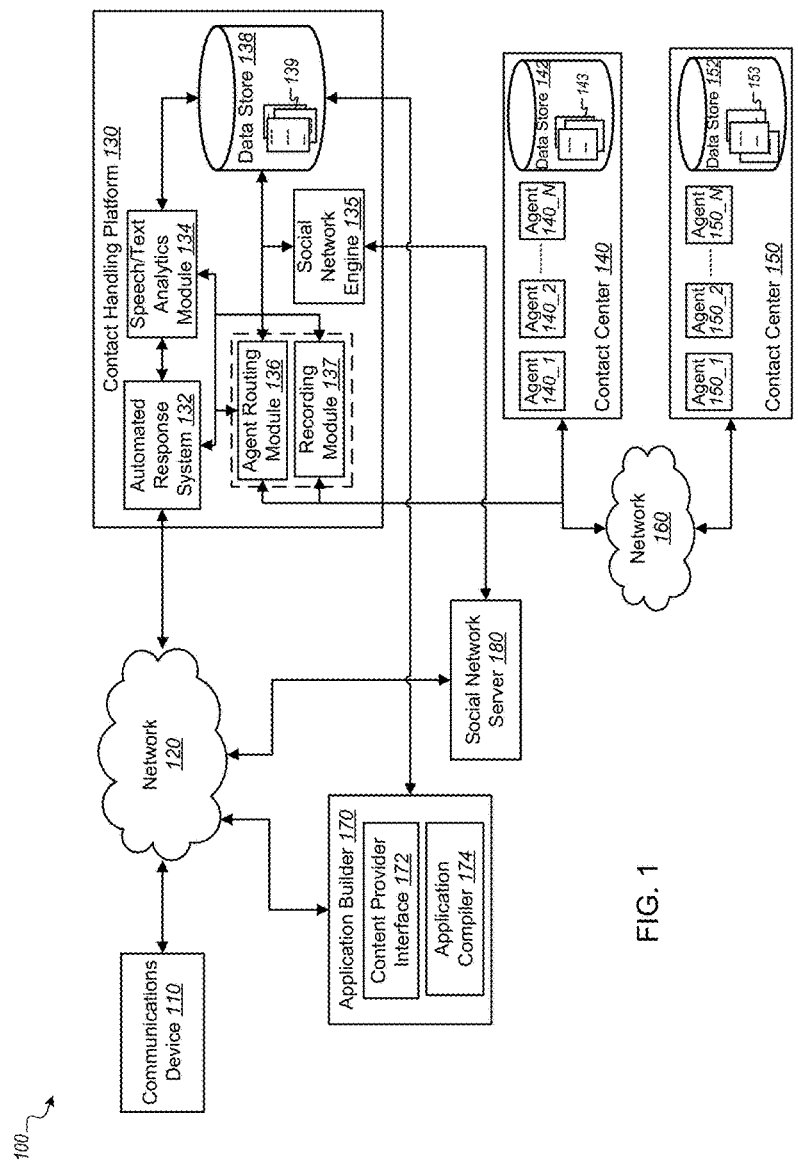
FIG. 1 is a block diagram of a communications system that enables provision and tracking of social media feedback to customer communications made to a contact handling platform.

A company (e.g., a service provider or a product provider) may wish to enable its customers to contact it through use of any of multiple different communications modes (e.g., phone, email, web chat, SMS or another communications mode that supports communications between a customer and a service or product provider). Each of the multiple different communications modes may offer a similar interactive experience to customers. For example, a customer may interact with the company by any one of phone, email, text messaging, and chat/instant messaging through a web browser (also referred to as web chat) to check his bank account balance or his credit card balance. The interaction flow for these multiple different communications modes, therefore, may share many common states and characteristics.

During a communications session with a customer, the company may wish to interact with customers, at least initially, using an automated response system. In some implementations, use of such an automated response system may decrease the costs associated with responding to customer contacts by decreasing the number of human agents that need to be employed to respond to the customer contacts. However, situations may arise where interaction with a customer using an automated response system is insufficient to address the customer's concerns, and therefore the communications session may be routed to human agents for handling. This may be the case, for example, for more complex customer contacts, such as when a customer contacts customer service for the company to troubleshoot a problem the customer is experiencing in using the product or service. The automated response system may not have the resources to provide a solution to the customer's problem, and, therefore, the customer communications may get routed to a human agent with expertise in solving such problems. As another example, a customer may have difficulty navigating the options provided by the automated response system and, therefore, may wish to talk to a human agent. Conversely, in some cases, the automated response system may not understand the customer input (e.g., due to erroneous option selections by the customer during the interaction or due to an inability to understand the customer's accent during a speech-based interaction).

In some implementations, a company may implement mechanisms that request a customer to provide feedback regarding the customer's experience during a recent customer communications session. For example, the request may be made by a human agent if the customer is interacting with the human agent, or the request may be made by the automated response system if the customer is interacting with the automated response system. The feedback request may ask the customer to provide the feedback in an Internet-based social media network, e.g., by posting the customer's feedback on a website corresponding to the social media network (also referred to as "social network"), such that the customer's feedback is viewable to a larger audience. In some implementations, the company may incentivize the customer to provide feedback, e.g., by offering to reward the customer with a gift, such as a coupon.

In this context, a social media network or social network may be a social networking service such as, for example, Facebook™, Google+™, Twitter™, Tumblr™, Pinterest™, Orkut™, MySpace™, or Yelp™, among others. A social networking service is a networked computer-based system that enables users to build social networks or social relations with each other by enabling the users to, for example, share interests, activities, backgrounds, and/or real-life connections. The computer system typically enables users to create representation of themselves, such as, for example, a user profile or page that is stored by the computer system and that is accessible to the user and to other users.

The user profile or page may include the user's social links, interests, pictures posted by the user, ideas or messages posted by the user, activities or events that the user is involved in, status of the user, and a variety of services that may be used by other users to communicate with the user (e.g., blog posts, e-mail or instant messaging). The social networking service enables a user to identify a group of users as the user's "friends." A friend of a user may enjoy privileged access to the user's profile or page (e.g., may perceive additional content on the profile or page that is only shown to the user's friends) and preferential mechanisms to communicate with the user (e.g., may have access to a private telephone number or a private e-mail address).

Moreover, the social networking computer system may be configured to provide a user with a social feed or a news feed. The social feed or news feed may take the form of a grouping (e.g., a list) of messages that indicate the user's activities on the social networking computer system, the activities of the user's friends on the social networking computer system, and, in some implementations, the aggregate activities of other users on the social networking computer system (which may include users that are not the user's friends). For example, the user may receive a message in the news feed that indicates that Friend A updated his profile information and another message that Friend B added 2 photos to one of his photo albums. In some implementations, the messages are listed in reverse chronological order. Notably, the messages may include links selectable by the user perceiving the news feed. For example, the message indicating that Friend B added 2 photos to one of his photo albums may include an embedded hyperlink selectable by the user to view the photo album to which the 2 photos were added by Friend B.

Referring back to the customer communications sessions, if the customer agrees to provide feedback, then, in some implementations, the company may provide the customer with prepopulated feedback content for posting to the social network website. For example, the company may send to the customer a message, such as an email or a text message, which includes a link to an online preprogrammed feedback form for posting to a social network website using the customer's account in the social network website.

In some implementations, the company may analyze customers' social media information to determine the service to be provided to the customers when they initiate customer communications sessions. For example, when a customer posts prepopulated feedback content on a social network website, the company may receive an acknowledgement from the social network that includes information about the customer's account on the social network, such as the customer's username (also referred to as the customer's "handle"). The company maps the customer's social network username to the customer's contact information that is known based on the communications session. In addition, using the customer's social network username, the company may analyze the customer's social network data to measure various parameters that indicate the importance or impact of the customer's activity on the social network. For example, the company may obtain data about the number of other social network users connected to the customer's account in the social network, the quantity of the customer's message postings ("posts") on the social network site, the content of the customer's posts and the reach of the customer's posts, among others. Based on these parameters, the company may compute a score, referred to as a social score or influence score, which provides a measure of the customer's impact on the social network.

Subsequently, when the customer initiates a new communications session, the company may determine how to handle the communications session based on the customer's social network influence score, which may be previously computed during an earlier communications session, or computed during the current communications session. Based on computing the customer's social network influence score, the company may determine whether the customer's activity on that social network is of high impact. For example, the customer's influence score for a particular social network may be compared to a predetermined threshold value. In some implementations, if the customer's social network influence score is greater than the threshold value, then the company may conclude that the customer's activity on that social network is of high impact (e.g., when the influence score increases with increased influence or impact of activity in the social network). However, in some other implementations, if the customer's social network influence score is less than the threshold value, then the company may infer that the customer's activity on that social network is of high impact (e.g., when the influence score decreases with increased influence or impact of activity in the social network). In some other implementations, In some implementations, when the company determines that the customer's social network activity is of high impact, the company may prioritize this customer's communications session compared to that of other customers who have lower social scores, and route this customer's communications session to a human agent more promptly, and/or to a more experienced human agent. By doing so, the probability that the customer will have a positive experience during the communications session may be increased. Therefore, the customer may provide a positive feedback about the experience on the social network. Due to the higher impact of the customer's activities on the social network, such positive feedback about the company may be widely disseminated to other users on the social network. Consequently, this may result in the company attracting newer customers, generating greater goodwill among existing customers, or receiving higher rankings in third-party customer satisfaction surveys, among other advantages.

In some implementations, a company also may record part or all of a communications session with a customer. This may be useful, for example, for quality or training purposes. For example, the recording of the communications session may be reviewed to determine why the customer was dissatisfied during the session, or how ably the human agent addressed the customer's concerns, or both.

The recording of the communications session may be performed in addition, or as an alternative, to routing the communications session to human agents for handling. In some implementations, mechanisms may be implemented to record customer communications sessions selectively. For example, a mechanism may be implemented that tracks the customer's satisfaction level during the communications session using a metric referred to as the customer's experience score, and triggers recording of the session when the customer's experience score falls below a certain threshold.

Given the above, it may be useful to provide such companies with the ability to design and develop a single interaction site that enables customers to interact with the company in an automated fashion via any one of multiple different communications modes, provide mechanisms to track customers' influence scores in one or more social media networks, and route the customer communications to human agents based on the influence scores and/or when automated interaction is insufficient to address the customer's issues. Additionally or alternatively, the interaction site may automatically trigger the recording of the communications sessions based on tracking customers' experience scores while interacting with the automated response system or human agents.

In one example, the mechanism may implement features that compute a customer's social network influence score, or analyze the customer's interaction with the automated response system to compute the customer's experience score, and determine threshold points at which the customer communications should be routed from the automated response system to human agents. The mechanism also may implement features that match a particular customer's communications session to specific human agents based on one or more metrics, such as, for example, a type of the communications session, the customer's social network influence score, an analysis of the customer's state of mind, a history of the customer's past interactions with different human agents, and experience levels of the human agents, among others.

The above exemplary mechanism, or another mechanism that is provided as an alternative or in addition to the above, may also implement features that analyze the customer interaction with the automated response system, or a human agent, or both, and determine threshold points at which recording of the customer communications should be triggered. When recording of the customer communications is triggered, the mechanism may record the customer's interaction with the automated response system, the conversation between the customer and the human agent, or both. These recordings may be stored as audio files for subsequent review and analysis. In addition or alternatively, the mechanism may record screen captures of the human agent's computer screen while the agent is engaged in the communications session with the customer. The screen captures may be collectively stored as a video file, or as individual image files, or both, for subsequent review and analysis.

For ease of exposition, the following description begins by describing a voice communications mode involving a voice site, which is configured to receive and respond to telephonic contacts, and then expands the description to cover an interaction site that supports contacts over any one of multiple different communications modes (e.g., email contacts, web chat contacts, and SMS contacts). In a voice communications mode, a customer may call a known customer service number for a product or service. By calling the customer service number, the customer may get connected to a contact handling platform (also referred to as a contact handling system) that enables the customer to interact with a voice site associated with the product or service.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. Because customers typically access a voice site by calling a telephone number using a voice communications device such as a telephone, a standard voice site is typically referred to as a single mode interaction site, i.e., an interaction site that supports a single type of contact. An enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). An enhanced voice site, therefore, may be referred to as a single mode interaction site that has been enhanced to enable some portions of the interaction flow to involve the communication of multimedia information. Notably, a call may said to be directed to a voice site if it is directed to a telephone number that has been defined as corresponding to the voice site.

The voice site called by the customer may be an automated interactive voice site that is configured to process, using pre-programmed scripts, information received from the customer that is input through the voice communications device being used by the user, and, in response, provide information to the user that is conveyed to the user through the voice communications device. The interaction between the customer and the voice site may be done using an interactive voice response system (IVR) that is included in the contact handling platform that is hosting the voice site. The contact handling platform is said to be "hosting" the voice site in that it receives and processes the various programming language modules corresponding to the voice site in order to perform the functionality of the voice site. In some implementations, the contact handling platform also may be referred to as a call handling platform, for example, when the contact handling platform is configured to handle primarily voice communications, even though the platform may support other communications modes. The contact handling platform may be provided by a third party service provider, which is referred to as a contact handling platform provider (or simply as a platform provider) in this context.

The IVR is configured to support voice commands and voice information using text-to-speech processing and natural language processing by using scripts that are pre-programmed for the voice site, for example, voice-extensible markup language (VoiceXML) scripts. The IVR interacts with the customer by using audible commands to prompt the customer to provide information and enabling the customer to input the information by speaking into the voice communications device or by pressing buttons on the voice communications device (when using, for example, a touch-tone telephone). The information input by the customer is conveyed to the IVR over a voice communications session that is established between the voice communications device and the IVR when the call is connected. Upon receiving the information, the IVR processes the information using the pre-programmed scripts. The IVR may send audible responses back to the customer via the voice communications device.

In some implementations, the voice site may be an enhanced voice site that is configured to support multimedia information including audio, video, images and text. In these implementations, the IVR of the contact handling platform is a multimodal IVR that is configured to support the exchange of multi-media information under the direction of the programming language modules of the enhanced voice site. An example of such a multimodal IVR is described in U.S. application Ser. No. 13/092,090, which is incorporated herein by reference for all purposes. The voice communications device also may be an advanced telephonic device (e.g., a smart phone) provided with a display for conveying visual information to the customer, and a processor capable of performing complex tasks such as logic processing wherein the associated instructions may be stored in memory included in the voice communications device. In such circumstances, the advanced voice communications device and the contact handling platform hosting the enhanced voice site can interact using one or more of voice, video, images or text information and commands.

In some implementations, the voice site may enable the contact handling platform to associate the customer's identifying information, e.g., the calling number of the customer's communications device, with one or more social network usernames used by the customer in various social network websites. As described previously, a social network username of a customer may originally be obtained when the customer posts feedback on a corresponding social network website using a preprogrammed feedback form provided by the voice site.

In some implementations, when the customer subsequently calls in to the voice site again, the contact handling platform may retrieve the social network username of the customer based on the association with the calling number, and use the social network username to analyze the customer's activity on the associated social network website. Based on the analysis, the contact handling platform may measure one or more parameters that indicates the customer's impact in the social network and use the measured parameters to compute the customer's influence score on the social network website. The parameters may be customized for the voice site by the designer of the voice site. In some other implementations, the contact handling platform may compute the customer's influence score on the social network website upon obtaining the customer's social network username, or periodically, or both, and store the computed social network influence score. Subsequently, when the customer calls in to the voice site, the contact handling platform may retrieve the stored influence score.

Based on the customer's social network influence score, either computed afresh when the customer calls in to the voice site, or previously computed, or both, the contact handling platform may determine a priority for handling the customer's call. For example, the contact handling platform may user a predetermined threshold value of the influence score to determine whether to route the call to the IVR or to a human agent, who may be available at a contact center that is connected to the contact handling platform. If the influence score is less than the predetermined influence score threshold, the call may be handled by the IVR; otherwise, the call may be routed to a human agent.

In some implementations, the contact handling platform may route the call to a human agent if the customer's social network influence score is higher than the predetermined threshold value of the influence score and a suitable agent is available to handle the call. In some other implementations, the contact handling platform may place the call in a communications session queue if the customer's social network influence score is higher than the predetermined threshold but all agents are busy handling other calls. A call may be placed in the session queue as it is waiting to be handled by a human agent, when no suitable human agents are currently available to handle the call when the call is routed for handling by an agent. When agents become available, a call at the head of the queue is removed from the queue and routed to a suitable agent who is available. In such implementations, the contact handling platform may place the calls in the session queue arranged in an order based on the customers' social network influence scores. For example, a first call associated with a first customer with a higher social network influence score may be placed ahead in the queue compared to a second call associated with a second customer with a lower social network influence score. Accordingly, the first call may be handled by a human agent earlier compared to the second call. However, in some implementations the reverse may be true, i.e., the second call may be placed ahead in the queue compared to the first call, such that the second call may be handled by a human agent earlier compared to the first call when an agent becomes available.

In some implementations, the contact handling platform may not automatically request feedback for a customer communications session, or may not automatically compute the customer's social network influence score. In such implementations, when a call is handled by a human agent, the human agent may determine whether to request the customer to provide feedback. Additionally or alternatively, the human agent may determine whether to compute the customer's social network influence score. The contact handling platform may provide a user interface option to the human agent to trigger computation of the customer's social network influence score. The user interface option may be displayed to the human agent on the display screen of the agent's machine.

In some implementations, when a customer communication is handled by the IVR, the contact handling platform may compute one or more metrics based on the interaction between a customer and the IVR. The metrics may be based on various parameters that may be tailored to the voice site by the designer of the voice site. Based on the computed metrics, the contact handling platform hosting the voice site may determine whether to continue interacting with the customer using the IVR, or whether to route the call to a human agent. Based on these or other computed metrics, the contact handling platform also may determine whether to record the customer's communications session, e.g., recording the conversation between the customer and the human agent, or to record screen captures of the agent's computer screen, when the call is routed to the agent.

For example, the voice site may compare the measured metrics to a first group of preconfigured threshold values of customer experience score. If the values of the metrics are below the customer experience score threshold values, the contact handling platform hosting the voice site may route the customer communications to a human agent. On the other hand, if the values of the metrics are above the threshold values, then the interaction with the customer may be continued using the IVR. In some implementations, when routing the customer communications to a human agent, the contact handling platform may refer to the customer's social network influence score to determine the order in which different customer communications sessions are to be handled by human agents. As described previously, the customer communications may be placed in an agent call queue when all the agents are busy handling other communications sessions, where the customer communications sessions in the queue may be prioritized based on the customers' social network influence scores.

Additionally or alternatively, the voice site may compare the measured metrics to a second group of preconfigured threshold values for the customer experience score. If the values of the metrics are below these customer experience score threshold values, the contact handling platform hosting the voice site may initiate recording of the customer communications session in a manner described previously. Implementation examples of contact handling platforms that record customer communications sessions based on comparing metrics to various thresholds are described in U.S. patent applications with application Ser. Nos. 14/230,586 and 14/230,792, which are incorporated herein by reference for all purposes.

In some implementations, multiple human agents may be available to handle communications from customers that are routed by the contact handling platform to the human agents. For example, several contact centers may be connected to the contact handling platform hosting the voice site, and several agents may be in each contact center. In such implementations, when the contact handling platform hosting the voice site determines to route a customer communications to a human agent, the contact handling platform may perform additional processing in accordance with parameters set for the voice site to select a human agent most suited to handle the particular customer communication. For example, the contact handling platform may execute one or more matching algorithms that consider the customers' social network influence scores, agent experience levels (represented, for example, using numerical scores), past history of interactions between particular customers and different available agents, specific agent skills in handling different types of calls (e.g., an agent may have more expertise in handling sales calls while another agent may be adept at handling technical support calls), among other factors.

As noted previously, a customer typically accesses a voice site by calling a telephone number using a voice communications device, such as a telephone. A voice site, therefore, is a single-mode interaction site in that it enables the contact handling platform to receive and respond to customer contacts that are voice calls. In contrast, a multi-modal interaction site enables the contact handling platform to receive and initiate responses to customer contacts in an automated fashion via any one of multiple different communications modes supported by the contact handling platform. For example, a multi-modal interaction site may receive and respond to customer contacts that are voice calls, email messages, SMS messages, web chat messages, or any suitable combination of the above.

A multi-modal interaction site may be a set of scripts or programming modules that offer a common interaction flow for handling customer contacts received in different communications modes. The set of scripts or programming modules may then be translated by an interaction flow processor of the contact handling platform into a corresponding set of mode-specific scripts or programming modules for each communications mode supported by the interaction site, and these translated mode-specific scripts or programming modules may then be executed by the respective sub-systems of the contact handling platform to enable automated interactions with customers over the different modes. For example, the pre-programmed scripts of the interaction site may be extensible markup language (XML) scripts. If the customer contacts the contact handling platform by using a telephone to call a telephone number associated with the interaction site, the interaction flow processor of the contact handling platform may translate the XML scripts of the interaction site to VoiceXML scripts for processing by an IVR to interact with the calling customer. Implementation examples of contact handling platforms able to host multi-modal interaction sites are described in U.S. application Ser. No. 14/032,443, which is incorporated herein by reference for all purposes.

Irrespective of the mode being used for a customer communication, the multi-modal interaction site may implement features to measure various metrics about the customer's social network influence score, or the automated interaction with the customer, or both, and determine whether to route the communication to a human agent based on the measured metrics, and/or whether to initiate recording of the communication. In some implementations, a human agent to whom a communication is routed may be selected from the same pool of human agents available for supporting disparate communications modes. For example, the same human agent may be selected to handle a voice call at one time, respond to an email message from another customer, or chat with a third customer using a web-based chat session. However, in some other implementations, different human agents may be used for supporting disparate communications modes.

The platform provider facilitates the creation and hosting of interaction sites on servers owned and operated by it. The platform provider may provide software or hardware, or both as a means to enable the design and development of an interaction site and to enable the hosting of the interaction site by the contact handling platform. The contact handling platform also may be connected to or may otherwise be in communication with one or more contact centers where human agents are present. The software and/or hardware means also may enable communications/connections between the contact handling platform and the contact centers, such that a customer communications received by the interaction site may be seamlessly routed to a human agent at a contact center.

The software and/or hardware means also may enable the design and development of applications that run a thin client on the communications device used by the customer. The thin client allows a communications interaction between the customer's communications device and an interaction site hosted by the contact handling platform using any one of the communications modes supported by the interaction site.

In the above scenario, the role of the entity (e.g., the company) providing customer service through the interaction site is that of a content provider. The developer of the entity or company (hereinafter referred to interchangeably as the "content provider") configures the interaction site that is to be used for the particular product or service and provides the logic for the interaction site that is to be executed by the contact handling platform. As part of configuring the interaction site, the content provider may select various parameters for which metrics will be computed for determining a customer's influence score(s) in one or more social network websites supported by the interaction site. Additionally or alternatively, the content provider may select various parameters for which metrics will be computed during an interaction with a customer. The content provider also may specify threshold values for the social network influence score(s) and/or the customer experience score that may be used to trigger routing a communication to a human agent, or to trigger recording of a communication, or both.

The content provider may configure the interaction site by using a graphical user interface (GUI) provided by the platform provider for configuring the interaction site. The platform provider handles the interpretation and compilation of the information provided by the content provider, and the creation and hosting of the interaction site based on the information. Since the platform provider manages the contact handling platform, the platform provider may enable the content provider to design an interaction site that supports communications with customers over any one of multiple different communications modes using a single, unified GUI.

The software or hardware means provided by the platform provider thus enable the deployment of interaction-enabled solutions on communications devices without requiring the content provider to engage in complex programming. Applications, or interaction sites, may be designed by the content provider using a web-based or some other remotely-accessible interface, and served on demand to client applications. In some implementations, the client applications can be add-ons that other smartphone applications can plug into. In some implementations, the software or hardware means enable customers to interact with a multi-modal application. The application is referred to as multi-modal in that it enables an application user (i.e., a customer of the content provider) to contact and interact with the contact handling platform via any of multiple different communications modes (e.g., phone, email, chat, Short Message Service (SMS), or another communications mode that support communications between the user and the interaction site). For example, the user may contact the contact handling platform by phone, provide information to the multi-modal platform by speaking, and receive information from the contact handling platform by hearing. Alternatively, the user may contact the contact handling platform by email (or SMS or web chat), and provide the same information to the contact handling platform by typing text and receive the same information from the contact handling platform by reading text.

FIG. 1 is a block diagram of a communications system 100 that enables provision and tracking of social media feedback to customer communications made to a contact handling platform. The communications system 100 allows a content provider to configure an interaction site that is operable to receive communications from customers of the content provider and compute social network influence scores of the customers by mapping the customer contact information to customers' social network usernames. The content provider may further configure the interaction site to compute customer experience scores and route the customer communications to an automated response system or human agents based on the computed social network influence scores and/or the customer experience score, and record the customer communications.

The communications system 100 is a multi-modal communications system, i.e., it enables a user to communicate with an interaction site using different modes of communication. Regardless of which mode of communication is used, the communications system 100 facilitates providing social media feedback to an established communications session or routing of a communications session selectively to an automated response system or a human agent based on computing the customer's social network influence score, or both.

A customer using a communications device 110 (e.g., a smartphone) is able to interact with the communications device 110 to request communication with an interaction site that is provided, for example, by a content provider. The communication may be, for example, to purchase a particular product or request a service offered by or made available by the content provider through the interaction site. For example, the user may indicate a desire to communicate with the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to communicate by inputting, via manual selection or otherwise, a telephone number associated with a customer service department of the content provider into the communications device 110 and initiating a call directed to the inputted telephone number. Additionally or alternatively, the user may indicate a desire to communicate by inputting and sending, via manual selection or otherwise, a SMS message that includes a short code and a keyword associated with the customer service department into the communications device 110. Additionally or alternatively, the user may indicate a desire to communicate by inputting, via manual selection or otherwise, a uniform resource locator (URL) associated with the customer service department into the communications device 110 to initiate a web chat session with the customer service department. Additionally or alternatively, the user may indicate a desire to communicate by inputting and sending, via manual selection or otherwise, an email that includes an email address associated with the customer service department into the communications device 110. Additionally or alternatively, the user may indicate a desire to communicate via a communications mode not listed in the above examples.

In some implementations, the communications request may be handled by a contact handling platform that hosts the interaction site for the content provider, and communicates with the communications device 110 to provide the requested service. As mentioned previously, an interaction site may be hosted by a third party platform provider that facilitates the creation and hosting of interaction sites on servers owned and operated by the platform provider. Depending on the communications means that a customer uses to access an interaction site, a corresponding handling system included in the contact handling platform may be used to process the request. Each handling system may present the interaction site to the customer in a different manner. For example, a call handling system may present the interaction site to the customer using voice messages that are generated by VoiceXML scripts. On the other hand, an SMS handling system may present the interaction site to the customer using SMS messages that are generated by XML scripts.

However, in many applications, the flow for providing a service to the customer includes the same or similar steps regardless of which communications mode the customer is using. In any of the communications modes being used, the contact handling platform may send a request to the customer to provide feedback on a social network website, and obtain the customer's social network username or handle if the requested feedback is posted. Subsequently the contact handling platform may compute values of social network parameters by data mining, i.e., analyzing, the customer's social media activities using the customer's social network username. Depending on whether the computed parameter values are above or below preconfigured thresholds, the contact handling platform may route the communications session from the corresponding handling system being used to a human agent for a live person-to-person interaction between the customer and the human agent.

Additionally or alternatively, the contact handling platform may compute metrics based on the interaction of the customer with the corresponding handling system. Depending on whether the computed metrics are above or below preconfigured thresholds, the contact handling platform may route the communications session from the handling system to a human agent for a live person-to-person interaction between the customer and the human agent. Additionally or alternatively, the contact handling platform may initiate recording of the communications session.

From a content provider's perspective, developing an interaction site for each of the communications modes using different tools or scripting languages can be burdensome. From a platform provider's perspective, the storage and management of an interaction site having different versions for each of the communications modes may be complicated. Accordingly, a communications system that can integrate the development of an interaction site for each of the communications modes using one development platform, and compile the developed interaction site into one scripting language that can be translated based on the communications mode used by a customer may enable a content provider and/or a platform provider to enjoy a decrease in costs associated with developing and managing interaction sites without compromising the quality of the user experience with the interaction site.

The communications system 100 includes a communications device 110 that connects, through a network 120, to a contact handling platform 130. The contact handling platform 130 is directly connected to a contact center 140. The contact handling platform 130 is also connected, over a network 160, to contact center 150. The communications system 100 also includes an application builder 170, which comprises a content provider interface 172 and an application compiler 174. The contact handling platform 130 is further connected to a social network server 180.

The communications device 110 allows a customer to interact with an interaction site hosted by the contact handling platform 130 over the network 120. The communications device 110 may be a voice communications device, such as a telephone, a cellular phone or a satellite phone. The communications device 110 alternatively may be an electronic tablet, electronic book reader, a personal digital assistant (PDA), a portable music player, or a computer, which includes one or more software or hardware applications for performing communications between the communications device 110 and the contact handling platform 130. The communications device 110 may have various input/output devices with which a user may interact to provide and receive audio, text, video, and other forms of data.

The network 120 enables connections between the communications device 110 and an interaction site hosted by the contact handling platform 130. In some implementations, the network 120 also enables connections between the application builder 170 and the contact handling platform 130, or connections between the contact handling platform 130 and the social network server 180, or both. The network 120 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. The network 120 may handle voice traffic, for example, Voice over IP (VOIP) network. The network 120 also may handle web traffic such as hypertext transfer protocol (HTTP) traffic and hypertext markup language (HTML) traffic. The network 120 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The contact handling platform 130 receives a communications request from the communications device 110 that is directed to an interaction site hosted by the contact handling platform 130, and interacts with the communications device 110 to provide the requested service through the interaction site. The contact handling platform 130 includes several modules, such as the Automated Response System (ARS) 132, speech/text analytics module 134, SNE 135, agent routing module 136, recording module 137, and a data store 138, which stores scripts or, more generally, programming language modules 139 corresponding to interaction sites hosted by the contact handling platform 130.

The ARS 132 processes the communications request from the communications device 110 and interact with the communications device 110 using an automated response system. The ARS 132 may include one or more processors and instructions stored in machine-readable media that are executed by the processors to perform various operations. In some implementations, the machine-readable media may include non-transitory storage media, such as hard disks and hardware memory modules.

In some implementations, the ARS 132 includes an interactive voice response (IVR) system that handles a call from the communications device 110 when the communications device 110 is operating in a voice communications mode. In such implementations, the IVR may include a voice gateway that receives user calls from or places calls to voice communications devices, such as the communications device 110, and responds to the calls in accordance with a voice program that corresponds to a flow of an interaction site. The voice program may be accessed from local memory within the voice gateway or from other storage media in the contact handling platform 130. In some implementations, the voice gateway processes voice programs that are script-based voice applications. The voice program, therefore, may be a script written in a scripting language, such as voice extensible markup language (VoiceXML) or speech application language tags (SALT). The IVR also may communicate with the data store 138 to read and/or write user interaction data (e.g., state variables for a data communications session) in a shared memory space.

In some implementations, the IVR includes a voice application server and computer systems that interface and provide data to the voice application server. The IVR may process voice application programs or scripts for communicating with the communications device 110. User responses received by the IVR may be analyzed and new programs or scripts that correspond to the user responses may then be processed.

In some implementations, the IVR may initiate an outbound call to the communications device 110. When the outbound call is established, the IVR may interact with the call recipient using the voice program.

In some implementations, the ARS 132 comprises an SMS handling system that handles a request to interact with an interaction site using an SMS mode. The SMS handling system may include an SMS gateway that receives user SMS messages from, or sends SMS messages to, communications devices, such as the communications device 110, and responds to the SMS messages in accordance with an SMS program that corresponds to a flow of an interaction site. The SMS program may be accessed from local memory within the SMS gateway or from other storage media in the contact handling platform 130. In some implementations, the SMS gateway processes voice programs that are script-based SMS applications. The SMS program, therefore, may be a script written in a scripting language such as, for example, extensible markup language (XML). The SMS handling system also may communicate with the data store 138 to read and/or write user interaction data (e.g., state variables for a data communications session) in a shared memory space.

In some implementations, the ARS 132 comprises an email handling system that handles a request to interact with an interaction site using an email communications mode. The email handling system 172 may include an email gateway that interfaces with the network 120. The email gateway is a gateway that receives user emails from or sends emails to communications devices, such as the communications device 110, and responds to the emails in accordance with an email program that corresponds to a flow of an interaction site. The email program may be accessed from local memory within the email gateway or from other storage media in the contact handling platform 130. In some implementations, the email gateway processes email programs that are script-based email applications. The email program, therefore, may be a script written in a scripting language such as, for example, extensible markup language (XML). The email handling system 172 also may communicate with the data store 138 to read and/or write user interaction data (e.g., state variables for a data communications session) in a shared memory space.

In some implementations, the ARS 132 comprises a chat handling system that handles a request to interact with an interaction site using a chat channel. The chat handling system may include a chat gateway that interfaces with the network 120. The chat gateway is a gateway that receives user chat messages from communications devices, such as the communications device 110, and delivers chat messages in response to the received user chat messages in accordance with a chat program that corresponds to a flow of an interaction site. The chat program may be accessed from local memory within the chat gateway or from the other storage media in the contact handling platform 130. In some implementations, the chat gateway processes chat programs that are script-based chat applications. The chat program, therefore, may be a script written in a scripting language such as, for example, extensible markup language (XML). The chat handling system also may communicate with the data store 138 to read and/or write user interaction data (e.g., state variables for a data communications session) in a shared memory space.

The speech/text analytics module (STAM) 134 performs speech, or text, or both, recognition and grammar matching for the customer communications sessions that are handled by the contact handling platform 130. The STAM 134 may include one or more processors and instructions stored in machine-readable media that are executed by the processors to perform various operations. In some implementations, the machine-readable media may include non-transitory storage media, such as hard disks and hardware memory modules.

In some implementations, the communications data (e.g., voice data, SMS text, web chat text, email text or any suitable combination of the above) that is received as part of a customer communications session handled by the ARS 132 is forwarded to the STAM 134. The communications data may be, for example, answers by the call recipient to questions that are presented by the ARS 132 based on the pre-programmed scripts or, more generally, the programming language modules implementing the interaction site. Alternatively or additionally, the communications data may be voice speech that is spoken by the customer, or a human agent, or both, after a customer has been routed to a human agent and the communications session proceeds based on voice interaction between the customer and the human agent.

The STAM 134 may have access to grammars for all possible answers for each question that might be presented by the ARS 132. The STAM 134 also may have access to grammars for various topics or phrases that are configured by the content provider while generating the interaction site. These topics or phrases correspond to topics or phrases that customers of the content provider are likely to query. For example, the content provider may be a mortgage company that configures a phrase to be "Can I reduce my mortgage rate?" or "Can I reduce my rate?" The phrase may be detected as spoken words, or as written text.

In addition, the STAM 134 may have access to grammars for common words or phrases that are likely to be uttered by a customer while communicating with a generic interaction site. These words or phrases may be made available by the platform provider to the content providers as a convenience to thereby allow the content providers to easily incorporate recognition of these common words or phrases into the functionality of their interaction sites. For example, such a topic or phrase may be "I want to talk to an agent" or "I need help," which are topics or phrases that are typically universally applicable to all content providers.

The grammars may be stored in the data store 138, or in memory local to STAM 134, or in other machine-readable media coupled to the contact handling platform 130. The grammars also may be dynamically generated.

The STAM 134 analyzes the communications data received from the communications device 110 during interaction between the customer and the ARS 132 and/or during interaction between the customer and a human agent. The STAM 134 attempts to match the communications data to the grammar that is known to it, or to grammar that is dynamically generated, or to a suitable combination of both. The STAM 134 sends grammar matches for the communications data to the Agent Routing Module (ARM) 136 with a confidence interval. The confidence interval may indicate an extent of match between the communications data and the particular grammar.

The social network engine (SNE) 135 processes social media feedback for customer communications sessions that are handled by the contact handling platform 130. The SNE 135 may include one or more processors and instructions stored in machine-readable media that are executed by the processors to perform various operations. In some implementations, the machine-readable media may include non-transitory storage media, such as hard disks and hardware memory modules.

In some implementations, the SNE 135 generates a feedback form with prepopulated content that is provided to a customer for posting to a social network website when the customer agrees to provide online feedback for the corresponding established customer communications session. The feedback form may include tracking information that enables the SNE 135 to associate the feedback to the particular customer. The feedback form also may include options for posting the feedback to multiple different social network websites, thereby enabling the customer to post the feedback to one or more social network sites selected by the customer from the provided options. The feedback form may be sent to the customer in one or more of various communication modes, e.g., as a text message, or an email, or postal mail, where the message that is sent may include a link to an online site from where the feedback form may be accessed.

When such feedback is posted to a social network website, an acknowledgement of the posted feedback is received from the social network by the contact handling platform 130. In some implementations, the SNE 135 processes the received acknowledgement based on the tracking information that was included in the feedback form generated by the SNE 135, and that is sent back by the social network as part of the acknowledgement. The SNE 135 determines the customer's social network username or handle from the received acknowledgement and, using the tracking information included in the acknowledgement, maps the customer's social network username or handle to other identifying information about the customer obtained from the communications device 110 as part of the customer communications session. The identifying information about the customer may include, among others, a calling number of the communications device 110, or an email address used by the customer, or a network protocol address (e.g., Internet Protocol address) of the communications device 110.

In some implementations, upon receiving the acknowledgement, the SNE 135 may send a reward coupon to the customer, if such a reward was promised when a request was made to the customer to provide feedback. The reward coupon may be sent to the customer in one or more of various communication modes, e.g., as a text message, or an email, or postal mail, where the message that is sent may embed the reward coupon in the body of the message, or may include a link to an online site from where the reward coupon may be accessed.

In some implementations, the SNE 135 accesses the customer's social network data using the customer's social network username that is obtained as described above, and analyzes or mines the accessed data. In some implementations, the SNE 135 accesses the customer's social network data that is publicly available.

In some implementations, when a customer communications session is established with the contact handling platform 130, the SNE 135 uses the customer's identifying information obtained from the communications session and determines whether the identifying information has been previously mapped to a social network username. If the customer's identifying information has been previously mapped to customer's social network username, e.g., as described above, the SNE 135 retrieves the customer's social network username that was previously stored, e.g., in the data store 138. The SNE 135 then accesses the customer's social network data using the customer's social network username, and analyzes or mines the accessed data. Upon analyzing the customer's social network data, the SNE 135 computes a social network influence score for the customer.

In some implementations, in addition, or as an alternative, to computing the social network influence score when a customer communications session is established, the SNE 135 pre-computes a customer's social network influence score, e.g., during a previous communications session, or periodically, or both. The SNE 135 stores the pre-computed social network influence score, e.g., in the data store 138. Subsequently, when a communications session is established, the SNE 135 retrieves the pre-computed social network influence score, e.g., from the data store 138. In some implementations, the SNE 135 may use the pre-computed social network influence score in addition to computing a new social network influence score when a customer communications session is established.

The SNE 135 computes a customer's social network influence score by determining values of various social network parameters based on analyzing the customer's social network data. In some implementations, the social network parameters are selected by the content provider at the time of building the interaction site, while in other implementations the social network parameters are determined by the platform provider implementing the contact handling platform 130.

A customer's social network influence score may be represented, for example, by a numerical score, which may be an aggregate of the social network parameter values. For example, if there are five parameters with values determined to be 8, 17, 3, 7 and 18 (on a scale of 1-20 each), then the social network influence score is 53 on a scale of 1-100. Alternatively, the base numerical score may be a 100 from which the parameter values are subtracted to arrive at the social network influence score. For example, considering the same parameter values as above, if the base score is 100, then the social network influence score is 47.

Based on the manner in which the social network influence score is computed, a higher influence score may indicate greater impact of the customer's activities in the corresponding social network, as compared to a lower influence score. In some implementations, the reverse may be true.

In some implementations, in computing a customer's social network influence score, the SNE 135 may assign different weights to the various social network parameters that are considered. The weights that are assigned may be configured by the content provider at the time of building the interaction site, or they may be predetermined by the platform provider, or a suitable combination of both.

In some implementations, the SNE 135 may obtain a customer's usernames from multiple social networks. These may be the case, for example, when the customer posts her feedback on two or more social network websites, and accordingly acknowledgements are received separately from each social network, with each acknowledgement including information about the customer's social network username in the corresponding social network. In such cases, the SNE 135 may associate some or all of the customer's social network usernames with the customer's other identifying information obtained from the communications session. In addition, the SNE 135 may compute the customer's social network influence score for some or all of the social networks corresponding to which the customer's usernames are obtained by the social network engine as described above.

The SNE 135 communicates with the social network server 180 to mine a customer's social network data. The social network server 180 may be located remote to the contact handling platform 130, and the communications between the SNE 135 and social network server 130 may be established over the network 120. The social network server 180 may be associated with a particular social network website that is supported by the contact handling platform 130 for posting of customer feedback data. There may be multiple such social network servers 180, with each server being associated with one or more particular social networks. These may be the case, for example, when the contact handling platform 130 supports multiple social networks in whose websites customers may post feedback about communications sessions.

When a customer posts a feedback on a social network website, the corresponding social network server 180 sends an acknowledgement for the customer's post. In some implementations, the acknowledgement is received by the contact handling platform 130 via the network 120. The acknowledgement is processed by the SNE 135 to obtain the customer's social network username. Subsequently, the SNE 135 communicates with the social network server 180 to obtain information about the customer's activity in the associated social network. The communication from the SNE 135 to the social network server 180 may include a request for the information, along with the customer's username in the social network for identifying the customer to the social network server 180. In some implementations, the communications may be made using application programming interfaces (APIs) provided by the social network.

The social network server 180 may store information about customers' accounts, message postings and other activities in the associated social network. In response to the request from the SNE 135, the social network server 180 may send some information about the customer's account, or activity, or both, in the associated social network. The information that is sent may include information that is publicly accessible. In some implementations, the customer's private information, e.g., message postings that are marked as private, are not be sent to the SNE 135.

The ARM 136 processes customer response data during customer communications sessions that are handled by the contact handling platform 130. The ARM 136 determines, based on processing the customer response data, whether to route a communications session to a human agent. In some implementations, the SNE 135 may provide a customer's social network influence score to the ARM 136 when a communications session is established. Based on processing the social network influence score, the ARM 136 is configured to determine whether to route the communications session to a human agent. In some implementations, the ARM 136 is also configured to track agent performance metrics during interactions with customers. In addition, the ARM 136 may execute agent matching algorithms to route a customer communications session to a human agent most suitable for handling the communications session.

The ARM 136 may include one or more processors and instructions stored in machine-readable media that are executed by the processors to perform various operations. In some implementations, the machine-readable media may include non-transitory storage media, such as hard disks and hardware memory modules. An example of the ARM 136 includes the Universal Routing Server developed by Genesys Lab.

In some implementations, the SNE 135 forwards to the ARM 136 a customer's social network influence score that is determined by the SNE 135 when the customer establishes a communications session with the contact handling platform 130, as described in the previous sections. In some implementations, the SNE 135 forwards multiple social network influence scores for a customer, e.g., when the customer's username in multiple social networks are known to the SNE 135, as described previously.

The ARM 136 may compare a customer's social network influence score to a threshold value and, based on the results of the comparison, decide whether to route the communications session to a human agent. As described previously, the threshold value may be configured by the content provider, who may specify the threshold during creation of the interaction site, or who may configure the threshold to be updated periodically, for example, during regular maintenance of the interaction site configuration. In some implementations, the threshold value may be dynamically generated, or updated, or both, during or based on the operation of the interaction site. For example, the SNE 135 or the ARM 136 may generate or update the threshold value by analyzing customer social network influence scores that were computed at different instances of time, e.g., during a series of previous communications sessions, where the social network influence score computed at each instance was stored in the data store 138. In some implementations, the content provider may specify a range within which the threshold value may be dynamically varied.

In some implementations, the SNE 135 may provide to the ARM 136 several different social network influence scores as noted above, e.g., corresponding to different social networks used by the customer. In such cases, the ARM 136 may compare the different social network influence scores against several different threshold values. Alternatively, the ARM 136 may select one of the social network influence score and compare the selected score to a threshold value. In some implementations, the ARM 136 generate an aggregate of some or all of the social network influence scores for the customer, and compare the aggregate score to a threshold value.

As noted above, the ARM 136 may decide to route the communications session to a human agent upon comparing the customer's social network influence score to a threshold value. For example, a single threshold value may be specified to be 60, on a scale of 1-100, by the content provider. If a customer's social network influence score is below 60, the associated communications session is handled by the ARS 132, but if the score is 60 or above, the ARM routes the communications session to an agent at a contact center, e.g., 140 or 150.

In some implementations, when a customer's social network influence score is above the threshold value such that the ARM 136 decides to route the communications session to a human agent, the communications session may be placed in a session queue, e.g., when a suitable agent is not immediately available to handle the communications session. In such cases, the ARM 136 may place the communications session in the session queue at a position that is based on the customer's social network influence score. For example, the ARM 136 may place the communications sessions in the session queue in a decreasing order of the customers' social network influence scores starting from the head of the queue, such that a communications session corresponding to a higher customer social network influence score is handled by an agent (when an agent becomes available) earlier than a communications session corresponding to a lower customer social network influence score.

In some implementations, when a customer's social network influence score is above the threshold value, the ARM 136 may select particular human agents for routing the communications session based on the value of the social network influence score. For example, the ARM 136 may route a communications session corresponding to a higher customer social network influence score to a more experienced agent, compared to a communications session corresponding to a lower customer social network influence score that may be routed to a less experienced agent.

Additionally or alternatively, in some implementations, the ARM 136 computes one or more metrics that provide a measure of a customer's experience during a communications session based on the customer data received at the ARM 136 from the ARS 132, or the grammar matches received from the STAM 134, or both. The ARM 136 may determine the customer's satisfaction level during the communications session based on the computed metrics. The customer's satisfaction level may be represented, for example, by a numerical score, which may be referred to as a customer experience score, and may be an aggregate of the values of the computed metrics. For example, if there are five metrics computed with values 8, 17, 3, 7 and 18 (on a scale of 1-20 each), then the customer experience score is 53 on a scale of 1-100.

Based on the manner in which the customer experience score is computed, a higher experience score may indicate greater satisfaction of the customer in interacting with the ARS 132, or with a human agent, or both, during a communications session, as compared to a lower experience score. In some implementations, the ARM 136 may compare the customer experience score to a threshold value and, based on the results of the comparison, decide whether to route the communications session to a human agent. For example, a single threshold value may be specified to be 60, on a scale of 1-100, by the content provider. If a customer's experience score is above 60, the associated communications session is handled by the ARS 132, but if the score is 60 or below, the ARM routes the communications session from the ARS 132 to an agent at a contact center, e.g., 140 or 150. The threshold value may be configured by the content provider, or may be dynamically generated and/or updated based on the operation of the interaction site.

In some implementations, the ARM 136 may use both the customer experience score and the social network influence score to route a customer communications session. For example, the ARM 136 may initially compare the customer experience score to a threshold value and accordingly decide whether to route the communications session to a human agent. Then the ARM 136 may check the customer's social network influence score to determine a position of the communications session in the session queue when no suitable agent is available to handle the communications session immediately, as noted above. When agents are available, the ARM 136 may determine a suitable agent for routing the communications session based on the customer's social network influence score.

In some implementations, the ARM 136 also may track performance of the agents based on their interactions with customers during communications sessions. For example, the ARM 136 may compute agent scores that provide a numerical measure of agent performance. The agent scores may be computed by measuring one or more metrics corresponding to agent parameters, which may be configured by the content provider, or preconfigured by the contact handling platform 130, or, by a suitable combination of both.

In some implementations, the agent parameters may include experience level, which provides a quantitative measure of the amount of experience agents have (e.g., in terms of duration of employment, or number of calls, or both) in handling customer communications. For example, the value of the experience level parameter may correspond to "high experience," "medium experience," or "low experience," which may correlate to preconfigured thresholds. An agent with "high experience" may have a higher value assigned to the experience level parameter compared to an agent with "medium experience," who in turn may have a higher value assigned to the experience level parameter compared to an agent with "low experience." In some implementations, the ARM 136 may route a communications session associated with a higher social network influence score to an agent with a higher experience level or agent score, compared to a communications session associated with a lower social network influence score, which may be routed to an agent with a lower experience level or agent score.

The agent parameters may include skills for handling customer communications sessions in specific categories. For example, expertise in handling customer communications sessions related to sales or technical support may be parameters that are used in computing agent scores.

The agent parameters also may include skills for handling different types of customers. For example, expertise in handling voice communications from customers with certain accents may be an agent parameter used in computing agent scores. In such implementations, the customer accents may be determined by the STAM 134 using speech recognition algorithms. As another example, skill in handling communications sessions from customers who are agitated may be an agent parameter used in computing agent scores. This skill may indicate how well (i.e., how successfully and/or quickly) an agent is able to soothe an agitated customer while interacting with the customer.

Another agent parameter that may be considered is the skill of a human agent in up-selling products to a customer, which indicates whether an agent successfully sells a product or service to a customer while interacting with the customer. In addition, this skill may indicate whether the agent is successful in selling additional products or services, or more premium versions of the products or services, to the customer.

The skill of a human agent in providing explanations to a customer may be configured as an agent parameter. This parameter indicates how well an agent is able to answer questions from a customer while interacting with the customer.

In some implementations, the agent parameters may include clarity of speech in interacting with a customer during a customer communications. This parameter indicates how clearly an agent speaks while interacting with a customer using a voice communications mode.

In some implementations, the content provider may configure specific weights for agent parameters corresponding to different skills, which are used in computing agent scores. For example, sales skills may be given a 5% weightage, technical support skills may be given a 7% weightage, and expertise in handling customers with accents may be given a 10% weightage.

The ARM 136 may arrange the agents in an order based on the agent scores. For example, in one implementation the agents may be arranged in a descending order from the agent with the highest agent score to the lowest, while in other implementations the agents may be arranged in a reverse order, i.e., from the agent with the lowest agent score to the highest.

In some implementations, when the ARM 136 determines that a communications session should be routed from the ARS 132 to a human agent, the ARM 136 may perform additional processing to select the most suitable human agent for the communications session. The selection may be based on various factors, which include, among others, customer social network influence scores, agent scores, history of customer experience scores during past interactions with different agents (i.e., the second customer experience score as mentioned previously), the type of the communications (e.g., whether the customer is seeking technical support or has billing questions) and the skills of different agents in handling different types of communications, as mentioned previously.

The ARM 136 may store the customer experience scores, the agent scores, and/or the historical data on customer experience with different agents, in the data store 138 or in memory local to STAM 134, or in other machine-readable media coupled to the contact handling platform 130.

In addition, or as an alternative, to the ARM 136, the recording module 137 processes customer response data during customer communications sessions that are handled by the contact handling platform 130. Based on processing the customer response data, the recording module 137 determines whether to initiate recording of the communications session. Upon determining in the affirmative to initiate recording of the communications session, the recording module 137 determines whether to record the communications session automatically (e.g. by the recording module 137 itself without waiting for explicit input from the human agent), or to send an alert message to the human agent to record the communications session when the communications session is routed to the human agent by the ARM 136. In the latter situation, the recording may still be performed by the recording module 137, but the recording is started after the human agent provides an input to start the recording.

The recording module 137 may include one or more processors and instructions stored in machine-readable media that are executed by the processors to perform various operations. In some implementations, the machine-readable media may include non-transitory storage media, such as hard disks and hardware memory modules. Examples of particular portions of the system 100 that implement recording of customer communications sessions (e.g., using a recording module) are described in U.S. Pat. No. 8,463,606 and U.S. application Ser. Nos. 14/015,649, 14/015,960, 14/015,974, 14/015,836 and 14/015,983, which are incorporated herein by reference for all purposes.

In some implementations, the ARM 136 and the recording module 137 may be implemented by the same module. This is indicated in the communications system 100 by the dashed line encompassing the ARM 136 and the recording module 137. In such implementations, the instructions for implementing the ARM 136 and the recording module may be a unified set of instructions that are executed by the same processor. The ARS 132 or STAM 134 may forward information to the ARM/recording module combined unit, which computes various metrics for determining a customer's satisfaction level during a communications session. The ARM/recording module combined unit may compare the computed metrics to predetermined thresholds and accordingly decide whether to record the communications session, or route the communications to a human agent, or both.

The recording module 137 may store data that is recorded as one or more audio files when the conversation between the customer and the human agent is recorded. If screen captures of the human agent's computer screen are recorded, then the recording module 137 may store the data as one or more video files, where each video file includes a continuous sequence of screen captures of the human agent's computer screen. Alternatively or additionally, the recording module 137 may store the screen captures as one or more image files. When the interaction between the customer and the automated response system 132 is recorded, then the recording module 137 may store the recorded data as audio files, e.g., if the customer interaction is speech-based, or as text files, e.g., if the customer provides touch-tone inputs following a script-based interaction with the automated response system 132, or as a suitable combination of both, e.g., when the customer interaction is a combination of speech-based and touch-tone inputs.

The recording module 137 may store the recorded data in the data store 138, e.g., as one or more files 139, which may be audio files, video files, or text files as described above, or any suitable combination of all these. Additionally or alternatively, the recording module 137 may store the recorded data in the premises of the content provider that is associated with the communications session. For example, the communications session may be handled by an agent, such as 140_N, in the contact center 140, which may be associated with a particular content provider. After the communications session is recorded, the recording module 137 may store the recorded data files (audio, video, or text) in the data store 142, e.g., as files 143. The storage in data store 142 may be performed in addition, or as an alternative to, storage in the data store 138. In a similar manner, if the customer communications session was handled by an agent in the contact center 150, the recording module 137 may store the recorded data files in the data store 152, e.g., as files 153, that is part of the contact center 150.

The data store 138 stores instructions executed by the contact handling platform 130 for hosting interaction sites configured by various content providers. For example, the data store 138 may store pre-programmed scripts or, more generally, programming language modules 139 corresponding to interaction sites hosted by the contact handling platform 130. Additionally or alternatively, the data store 138 may store customers' social network usernames mapped to other identifying information that are used for establishing communications sessions with the contact handling platform. In such implementations, the data store 138 may store information about customers' activities on various social network websites that are obtained by analyzing the social network data using the customers' corresponding social network usernames. The data store 138 also may store values for social network parameters that are determined by analyzing the social network data, and customers' social network influence scores that are computed based on the determined parameter values. Additionally or alternatively, the data store 138 may store interaction data corresponding to customer interactions associated with communications sessions, for example, the customer experience scores, the agent scores, and/or other suitable data that are used by the ARM 136, or the recording module 137, or both.

In some implementations, the data store 138 may be implemented as one or more database servers, while in some other implementations it may be implemented as a file system. In other implementations, the data store 138 may be implemented as an array of hard disks or other suitable memory modules that are either included within, or coupled to, the contact handling platform 130.

In some implementations, the contact center 140 or the contact center 150, or both, may include a specific physical location, such as a building or an office campus. One or more agents may be physically present in each contact center for interacting with customers when associated customer communications sessions are routed to the agents. For example, agents 140_1, 140_2 through 140_N are present in contact center 140, while agents 150_1, 1502 through 150_N are present in contact center 150.

In other implementations, one or more of the contact centers 140 or 150 may be a logical grouping of agents who are present in disparate locations. For example, some of the agents 140_1, 1402 through 140_N may work remotely, e.g., from their respective residences, while some other of the agents 140_1, 1402 through 140_N may be present in an office building or campus associated with the contact center 140. In some implementations, all of the agents 140_1, 1402 through 140_N that are managed by the contact center 140 may work remotely, with the contact center 140 providing the infrastructure for coordinating and managing the agents, such as interfacing with the contact handling platform 130, routing to specific agents communications sessions that are received from the ARM 136, and the like.

Some contact centers, such as 140, may be directly connected to the contact handling platform 130, while some other contact centers, such as 150, may be connected remotely, for example through the network 160. In some implementations, the contact center 140 may be co-located with the contact handling platform 130.

One or more contact centers also may include data stores, such as data store 142 included in contact center 140 or data store 152 included in contact center 150. As described previously, the data stores 142 or 152 may be similar to the data store 138. The data stores 142 or 152 may be configured for storing audio, video, or text files associated with recorded data of customer communications sessions that are recorded based on instructions configured at the recording module 137. The data stores 142 or 152 also may be configured for storing other forms of data, e.g., that are unrelated to the recordings of the customer communications sessions.

The network 160 allows connections between interaction sites hosted by the contact handling platform 130 and the contact center 150. In some implementations, the network 120 is also configured to allow connections between the contact center 140 and the contact center 150. The network 160 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. The network 160 may handle voice traffic, for example, Voice over IP (VOIP) network. The network 160 also may handle web traffic such as hypertext transfer protocol (HTTP) traffic and hypertext markup language (HTML) traffic. The network 160 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The application builder 170 facilitates the creation of interaction sites. The application builder 190 utilizes various components to enable the creation of interaction sites, such as a content provider interface 172 and an application compiler 174. The different components of the application builder 170 may be co-located in a single physical location, or they may be geographically distributed, with dedicated high capacity links interconnecting the various components. In some implementations, the application builder 170 may be co-located with the contact handling platform 130, such that the two are parts of the same cohesive unit.

A content provider may access the application builder 170 over the network 120, for example using a computing device that includes one or more software or hardware applications for performing communications with the application builder 170. The computing device used by the content provider may have various input/output modules to exchange audio, text, video, and other forms of data with the application builder 170.

The content provider interface 172 is a GUI front-end for an application builder tool that can be used to build an interaction site that is capable of handling interactions using multiple communications modes. In some implementations, the content provider may access the content provider interface 172 using a web browser that runs on the computing device used by the content provider. By accessing the application builder using the content provider interface 172, the content provider may create interaction sites and interaction pages that will be used by the multi-modal communications system 100 when processing a communications request from a customer to the interaction site created by the content provider.

In the context of this discussion, a "page" is a discrete programming routine configured to perform a discrete function. A page may be defined by a user of the contact handling platform 130 (e.g., a content provider) through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to perform the discrete function of the page. Examples of different pages include message pages, question pages, logic pages, transaction pages, call queue pages and multi-modal action pages. These different pages are described in further detail in the co-pending U.S. application Ser. No. 13/092,090, which is incorporated herein by reference for all purposes.

Figure 2A:
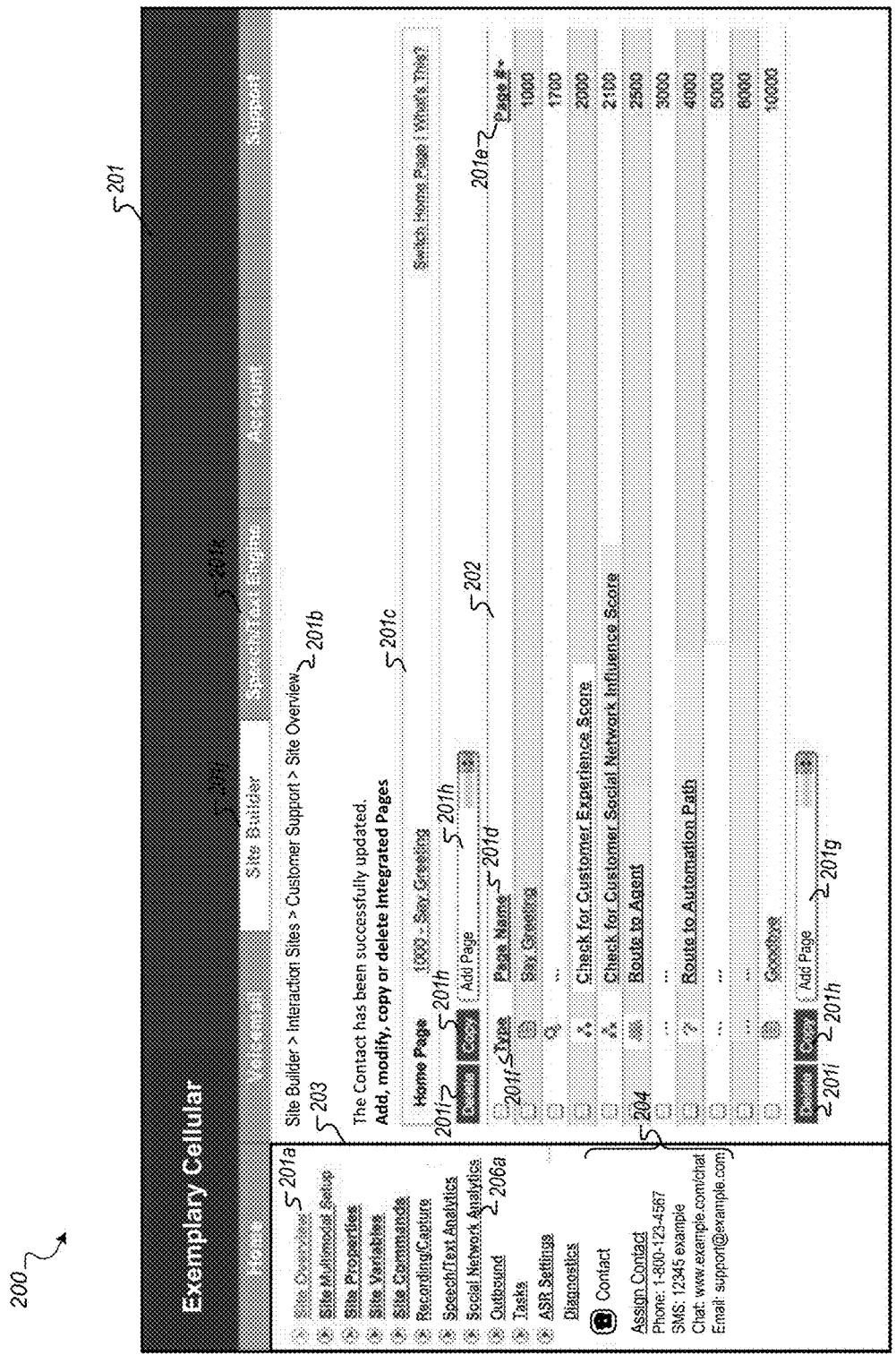
FIGS. 2A-2C illustrate examples of pages provided by a graphical user interface (GUI) of an application builder tool that is used by a content provider to create an interaction site for a communications system that facilitates providing social network feedback for user communications sessions and routing user communications sessions to human agents based on social network parameters.
Figure 2B:
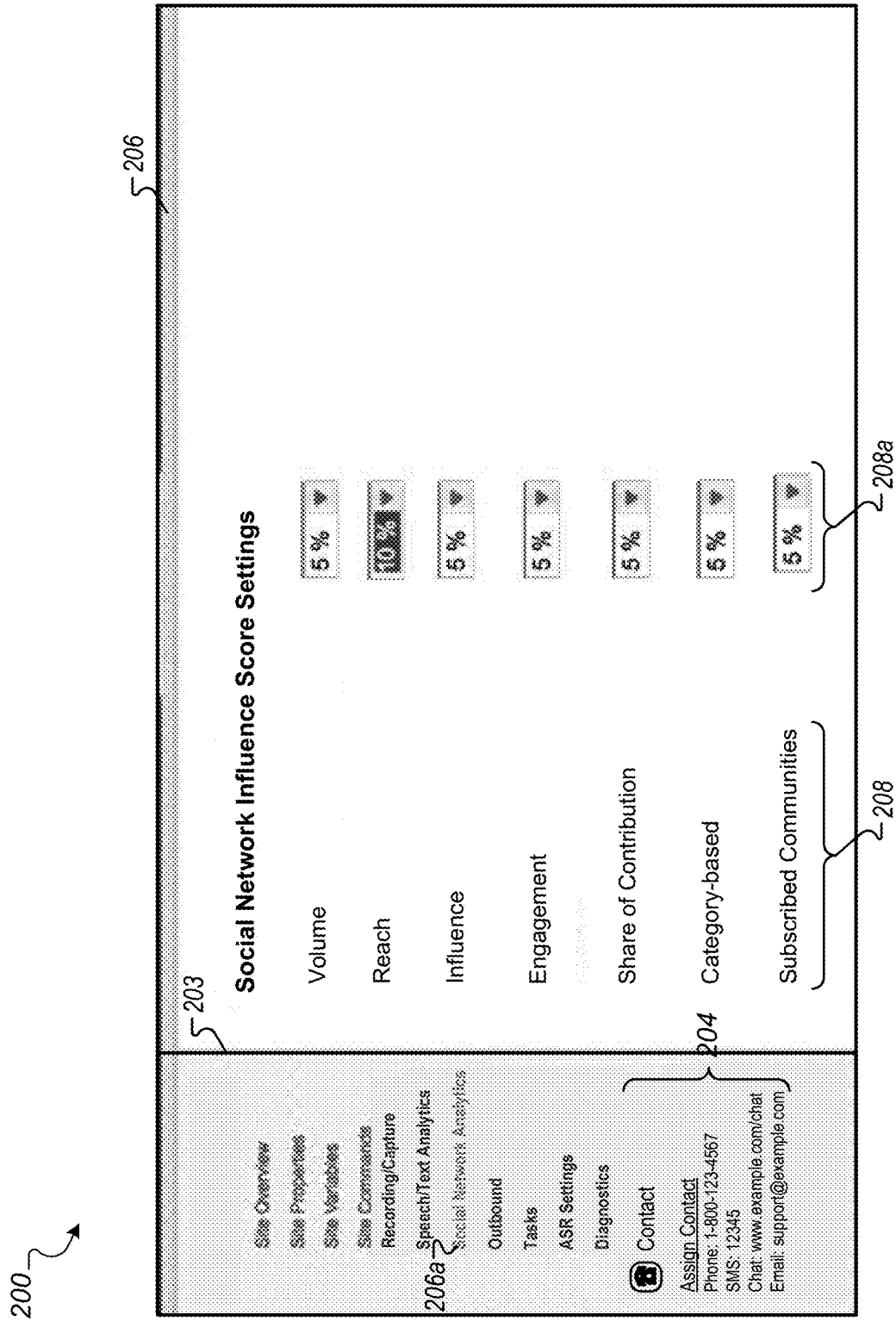
Figure 2C:
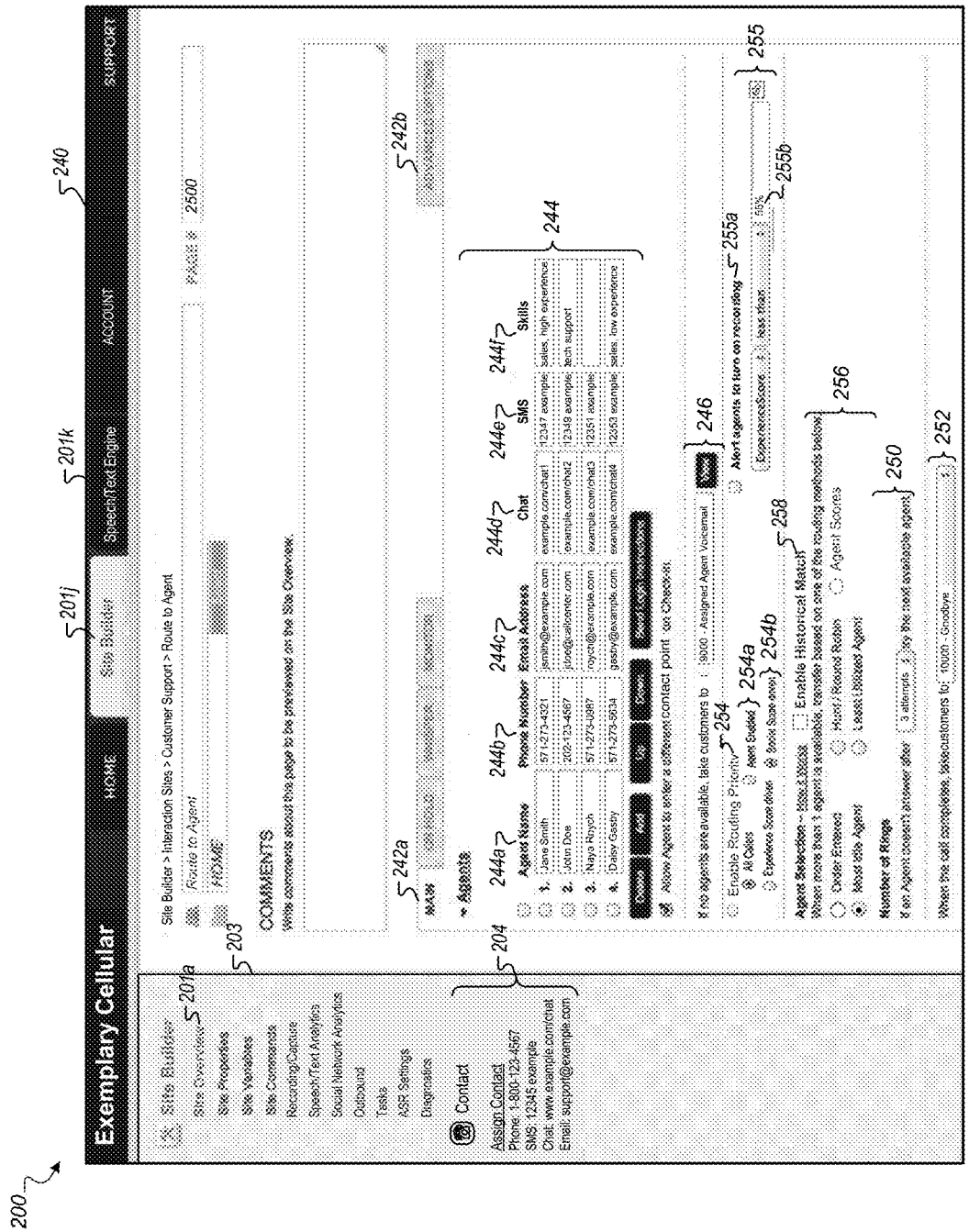

An interaction page is a particular type of page that performs the function of delivering content to, or receiving content from, a customer via a communications mode used by the customer to contact the contact handling platform 130 (e.g., voice communications mode for telephone contacts, web chat communications mode for chat contacts, email communications mode for email contacts, and SMS communications mode for SMS contacts). A "voice page" is a particular type of interaction page that performs the function of delivering audible content to and/or receiving audible content from a customer that called a telephone number assigned to the interaction site. The customer is typically a caller to an IVR and the audible content is typically speech. FIGS. 2A-2C illustrate examples of one or more pages provided by a GUI of an application builder tool, such as the application builder 170.

The interaction sites and pages created by the content provider using the content provider interface 172 are interpreted and/or compiled by an application compiler 174 to generate scripts or, more generally, programming language modules that are executed by the contact handling platform 130 to interact with a user accessing the interaction site. In some implementations, the application compiler 174 may generate an interaction flow document, which may include XML scripts or code that correspond to pages (i.e., programming modules) of an interaction site created by the content provider. The interaction flow document may be stored in the data store 138. The one or more processors included in the contact handling platform 130 may access the scripts from the data store 138 and translate them into a language that can be processed by a particular handling system when the contact handling platform 130 interacts with a customer communicating with the interaction site.

In addition to the XML scripts, the application compiler 174 may also generate other types of scripts (e.g. Java scripts) and other types of executable code using other programming languages based on pages created for the interaction site by the content provider (e.g., based on transaction pages). The other types of scripts may be used by the contact handling platform 130 to interact with the customer communicating with the interaction site over the data network 120.

FIGS. 2A-2C illustrate examples of pages provided by a GUI 200 of an application builder tool that is used by a content provider to create an interaction site for a communications system that facilitates providing social network feedback for user communications sessions and routing user communications sessions to human agents based on social network parameters. In general, each interaction site includes a flow of the interaction states that provide an overview of how users interact with the interaction site during the execution of the interaction site. A state may be configured using a page, such as, for example, a voice page or, more generally, an interaction page. In some implementations, the states of the flow for an interaction site are the same across multiple communications channels. For example, a first customer may access an interaction site using a voice communications device, and in the first state, the first customer would experience a "Say Greeting" interaction page that greets the first user via voice. A second customer may access the same interaction site using SMS, and according to the flow, the second customer would also interact with the "Say Greeting" interaction page that greets the second customer via a SMS message.

It may be a tedious process if the content provider is required to configure the same greeting message for each of the communications channels. The content provider interface 172 of the application builder 170 provides the content provider with a unified interface to create and configure pages that are common to the various communications modes without the need to enter duplicate information for these communications modes. For example, the GUI 200 may be implemented by the content provider interface 172 included in the application builder 170 that is used by content provider for creating and managing an interaction site hosted by the contact handling platform 130. Accordingly, the following sections describe the GUI 200 with respect to the communications system 100. As a specific example, the components of the GUI 200 are described as used by a cellular service provider, referred to as "Exemplary Cellular," to create an interaction site for providing customer service to its cellular subscribers. However, the GUI 200 and the associated application builder tool may be used by other systems, content providers or application developers to create any interaction site to perform any desired automated interaction flow in response to a customer contact.

FIG. 2A illustrates an example GUI 200 showing a site overview page 201 that is presented to the content provider when the content provider logs into the application builder 170 (e.g., by inputting a user identifier and a password) via, for example, a web browser running on the computing device used by the content provider. The Site Overview page 201 may be accessed by the content provider by selecting an interaction site from among a displayed list of interaction sites associated with (e.g., designed by, or for) the content provider, clicking on the desired interaction site (e.g., "Customer Support") and then clicking on the "Site Overview" link 201a in the navigation panel 203. In some implementations, the content provider may have to click on a top level tab, such as "Site Builder" 201j, before clicking on the "Site Overview" link 201a. In some implementations, the navigation panel 203 is present to the left of the page currently displayed (e.g., the Site Overview page 201) and provides links to various system pages that can be directly accessed by the content provider from the page currently displayed.

The Site Overview page 201 provides a listing, referred to as the page flow 202, of all the different pages created by the content provider to define the particular interaction site (e.g., "Customer Support" in the example shown). The name of the interaction site is specified in the heading 201b of the Site Overview page 201 (e.g., "Customer Support").

When a customer communicates with the "Customer Support" interaction site, the first page that is processed is identified in the "Home Page" field 201c. The content provider may specify any page that the content provider wants to be processed first as the Home Page 201c. In some implementations, the first page in the listing of pages is the same page that is listed as the "Home Page" 201c. However, in other implementations, the page that is the "Home Page" 201c is not the first page in the listing of the pages in the Site Overview page 201.

The order in which the various pages are processed is determined by the links in the respective pages. Each page usually includes a link to the next page that is to be processed. For example, the interaction site illustrated in the Site Overview page 201 has a page flow 202 of several interaction pages, including the interaction pages "Say Greeting", "Check for Customer Experience Score," "Check for Customer Social Network Influence Score," "Route to Agent," "Route to Automation Path" and "Goodbye." A descriptive page name, which is shown by the Page Name field 201d, is associated with each page and helps to identify the function of the corresponding page. In addition, each page also may be identified by a page number that is shown in the "Page #" field 201e. The page name and page number of a page are specified by the content provider when creating the pages for the interaction site. A page may have a unique page name, or it may have a page name that is similar to the page name of another page. In case two or more pages share the same page name, they may be differentiated based on the page numbers. In some implementations, a page may be referred to by different names in different linking pages. However, the page number for each page uniquely identifies a page. A user may access and modify any of the pages displayed in the page flow 202 by selecting them from the displayed list.

In some implementations, the type of each page is denoted by a graphical icon that is shown by the Type field 201f. Pages of different types may have different icons. For example, the pages "Say Greeting" and "Goodbye" are message pages, "Check for Customer Experience Score" and "Check for Customer Social Network Influence Score" are logic pages, "Route to Agent" is a call queue page and "Route to Automation Path" is a question page, as indicated by their different icons.

Additionally or alternatively, in some implementations the Site Overview page 201 may present the pages in a two dimensional or three dimensional display that visually depicts the links between the pages. For example, each page may be displayed as a page graphical element, such as, for example, a rectangle or a block, with one or more link graphical elements, such as, for example, lines, connecting the page graphical elements to other page graphical elements to which they are linked. Text may be overlaid on or displayed in proximity to the page and/or link graphical elements to communicate the identity of the corresponding page and/or the nature of the link between the elements.

The content provider may create a new page by clicking the "Add Page" button icon 201g. When the "Add Page" button icon 201g is clicked, a new page is added to the page flow 202. In response to selecting the button icon 201g, the GUI 200 may present a set of page templates for selection in, for example, a drop-down list. The page templates may include, for example, message pages, question pages, logic pages, call queue pages, transaction pages, and multimodal action pages. The user may select a page template from the list to generate a page of the corresponding type using the template. The template presents to the user the necessary fields and/or controls for that page type and the user may populate the fields (e.g., by typing text into the fields) and/or select the controls to generate a page of the corresponding type.

Alternatively, a new page may be created by copying a previously created page. The content provider may select the page to be copied by checking the checkbox to the left of the page to be copied and then selecting the "Copy" button 201h. An existing page can be deleted by checking the checkbox to the left of the page, and then clicking the "Delete" button 201i.

In some implementations, the contact information for the interaction site is provided by the contact field 204 in the navigation panel 203. The contact field 204 includes information corresponding to each communications mode supported by the interaction site. In the example shown in FIG. 2A, the "Customer Support" interaction site supports telephone, SMS, web chat and email communications modes, and therefore the contact field 204 includes information for each of these modes. A customer communicating with the interaction site may either call the telephone number 1-800-123-4567, send an SMS to "12345 example," send web chat messages to www.example.com/chat, or send an email to support@example.com, as shown by the contact field 204, or use any suitable combination of all of the above.

As described previously, as part of generating the interaction site, the content provider may configure various parameters that are to be used by the contact handling platform 130 for computing customers' social network influence scores. In some implementations, the content provider may configure these parameters using settings interfaces. FIG. 2B illustrates an example GUI 200 showing a settings interface "Social Network Influence Score Settings" 206 that is presented to the content provider when the content provider configures parameters used by the SNE 135, or the ARM 136, or both, in computing customers' social network influence scores.

In this context, a settings interface is an interface (e.g., a web page) accessible through a web browser that provides various application-level data points or parameters, which are used by scripts or, more generally, programming language modules implemented by the interaction pages in computing a score, e.g., the social network influence score or the customer experience score. As described previously, the social network influence score is a system variable that is used by the application (i.e., the interaction site) in determining whether to route a customer's communications session to a human agent, or to prioritize the customer communications session in a session queue, or both. In particular, the social network influence score may be used by the ARM 136 in determining the routing path for a customer's communications made to an interaction site hosted by the contact handling platform 130. A settings interface is differentiated from an interaction page in that a settings interface does not describe scripts or, more generally, programming language modules that are executed as part of an interaction flow between a customer and an interaction site.

A different settings interface than the one shown in FIG. 2B may be used for computing the customer experience score, which is a system variable that is used by the application (i.e., the interaction site) in determining whether to route a customer's communications from the ARS 132 to a human agent. Additionally or alternatively, the customer experience score may be used by the recording module 137 in determining whether to initiate recording of a customer's communications made to an interaction site hosted by the contact handling platform 130.

Referring to FIG. 2B, a content provider may access the interface 206 by selecting an interaction site from among a displayed list of interaction sites associated with (e.g., designed by, or for) the content provider, clicking on the desired interaction site (e.g., "Customer Support") and then clicking on the "Social Network Analytics" link 206a in the navigation panel 203. In some implementations, the content provider may have to click on a top level tab, such as "Site Builder" 201j, before clicking on the "Social Network Analytics" link 206a in the navigation panel 203.

As shown, the interface 206 includes social network parameters 208 that are used when a customer interacts with a contact handling platform during a communications session and the customer's username in a social network is determined by the contact handling platform. In some implementations, the platform provider may pre-configure the parameters that are shown in a settings interface. In other implementations, the platform provider may enable the content provider to select from a set of parameters that are to be included in a settings interface, or enable the content provider to create its own parameters, or a suitable combination of both.

The parameters 208 include "Volume," "Reach," "Influence," "Engagement," "Share of Contribution," "Category-based" and "Subscribed Communities." Values for some or all of these parameters are measured by the SNE 135 by accessing the customer's data in a social network using the customer's username in the social network, and analyzing the accessed data. In some implementations, the SNE 135 may measure values for these parameters for more than one social network, e.g., when the customer has posted feedback in multiple social networks and the customer's usernames in the different social networks are known to the contact handling platform 130, i.e., the SNE 135.

The "Volume" parameter measures the amount of content posted by the customer in the social network being considered. This may include the length of content posted by the customer, or the frequency at which the postings are made, or both. In some implementations, the content that is considered include content that makes references to the products or services of the content provider associated with the interaction site corresponding to which the parameters are being measured.

The "Reach" parameter provides a measure of the size of the audience that can see content posted by the customer in the social network being considered. Values of this parameter computed at different times indicate whether the size of the audience is growing or shrinking, and the rate at which the size is changing.

The "Influence" parameter measures whether the content posted by the customer in the social network website can influence other social network users to take similar action. For example, the customer may post positive feedback about a product or service offered by the content provider. If the customer's positive feedback influences other social network users, who reads the customer's posts, to purchase the particular product or service, then the value of the "Influence" parameter may be high. On the other hand, if the customer's positive feedback does not influence other social network users to purchase the particular product or service, then the value of the "Influence" parameter may be low.

The "Engagement" parameter measures whether, when the customer posts content on the social network website, other social network users are responding to the content, e.g., by endorsing the user's post (such as "liking" the post in Facebook™ or "+1" in Google+™), commenting on the posted content, reposting the content in their respective accounts (such as "re-twitting" a Twitter™ post or pinning images from the post in Pinterest™), among others. The "Engagement" parameter thereby indicates whether other users are seeing the customer's content and interacting with the customer. In some implementations, the content that is considered include content that makes references to the products or services of the content provider associated with the interaction site corresponding to which the parameter is measured. In such implementations, the "Engagement" parameter measures whether other social media users interact with the content provider's brand after seeing the content posted by the customer.

The "Share of Contribution" parameter measures the extent to which the customer's social network posts are mentioned by other social media users, in comparison to posts made by others. If content posted by the customer is referred to more often in comparison to other users, then the customer's "Share of Contribution" may be high. In some implementations, the content that is considered in measuring this parameter include content that makes references to the products or services of the content provider associated with the interaction site corresponding to which the parameter is measured. In such implementations, the "Share of Contribution" parameter may measure whether the customer participates in all relevant conversations associated with the content provider's brand, or whether the customer is participating in conversations involving target user groups of the content provider, or both.

The "Category-based" parameter provides a measure of the impact of the customer's social media posts in particular categories. This may be useful when the customer has accounts in multiple social networks, but the content provider is interested in tracking the customer's activity in a few of these social networks, such as ones that are relevant to the content provider's business. For example, the content provider may be a restaurant business that is interested in tracking customer feedback that are primarily geared towards restaurant reviews. In this case, the SNE 135 may analyze customer content posted in restaurant review categories of social network websites. In some implementations, the SNE 135 may analyze customer content posted all categories of social network websites, but assign greater weight to customer content that is associated with restaurant reviews. The SNE 135 may parse the customer posts to determine whether the included content deal with the categories of interest to the content provider.

In some implementations, the customer's social network influence score may be higher for some categories in comparison to some other categories. For example, the customer may be more prolific in posting content reviewing movies, compared to reviewing restaurants. Accordingly, the customer's category-based social network influence score may be lower for restaurant-review social network websites, compared to movie-review social network websites. However, the content provider that is associated with the restaurant business may still consider the lower social network influence score corresponding to the restaurant-review social network websites in routing the customer's communications session to agents, even though the customer's communications session might receive higher routing priority if the social network influence score corresponding to movie-review categories were to be considered.

In addition, or as an alternative, to the "Category-based" parameter, the "Subscribed Communities" parameter measures the impact of the customer's social media posts in particular social media groups or communities. This may be useful when the content provider is interested in tracking the customer's posts that are only relevant to the content provider's business. For example, the content provider may be an outdoor activities company that is interested in tracking customer posts that are directed towards outdoor activities such as hiking, camping, rock climbing, or the like. In this case, the SNE 135 may measure whether a customer is a member of user groups or communities in a social network that are for outdoor activity enthusiasts, and/or the extent to which the customer contributes to the activities of such groups. The SNE 135 may base the customer's social network influence score on a measurement of this parameter.

In some implementations, the customer's social network contributions may be higher for some subscribed communities in comparison to some other subscribed communities. For example, the customer may be a member of multiple groups directed towards movie reviews in a social network and regularly post content in these groups, but the customer may be subscribed to lesser number of groups for outdoor activity enthusiasts in the social network, or post less content in these groups, or both. Accordingly, the customer's social network influence score, when computed based on the number of outdoor activity groups the customer is subscribed to, may be lower compared to a social network influence score based on the customer's membership in movie review groups. However, the outdoor activities company may still consider the lower social network influence score in routing the customer's communications session to agents, even though the communications session might receive higher routing priority if the social network influence score corresponding to movie-review groups were to be considered. In some implementations, the "Category-based" parameter and the "Subscribed Communities" parameter may be combined together in a single parameter, which measures the impact of the customer's social media posts in particular categories, or in specific social media groups, or both.

Each of the parameters 208 is characterized by a weight 208a. The weight 208a indicates the numerical value that is assigned to a parameter by the SNE 135. The assigned value is used to compute the overall social network influence score for a customer. For example, as shown, considering the "Volume" parameter, a 5% weight 208a is assigned to the amount of content posted by the customer in the social network that is considered.

In some implementations, the weights 208a are pre-determined by the contact handling platform 130, and provided to the content provider when the corresponding parameters are selected by the content provider. In some implementations, the content provider may be allowed to set its own weights or change the values of the weights provided by the contact handling platform. This may be useful in situations where the content provider wants to customize the response of its interaction site to suit the perceived needs of its customers, which may differ from content provider to content provider, or from interaction site to interaction site, or both.

For example, the contact handling platform 130 may set the default weight 208a of the "Reach" parameter to 5%. However, this weight may be unsuitable for a particular content provider, who may consider that the default weight is too high or too low. Therefore, the content provider may change the weight 208a of the "Reach" parameter to 10%, as shown.

In this manner, the content provider may customize the weights for the parameters that it selects. In some implementations, such as when all the parameters available are provided in the setting interface 206, the content provider may de-select a parameter by setting its weight to 0%. Therefore, for every measurement of the associated parameter, a 0% weight will be assigned to the parameter. Consequently, the social network influence score that is computed will be unchanged, since, for example, 70%+ 0%=70%.

In some implementations, the weights 208a are not assigned as percentages but rather are assumed using some other unit, such as absolute values. This may be the case, for example, when the social network influence score is computed as a sum of the weights. In such a case, the default customer social network influence score may be 0, and for every weight assigned to a parameter, the social network influence score is updated by adding the weight to the score. For example, the "Volume" parameter may have a weight of 5. When the corresponding parameter is measured, the SNE 135 may update the social network influence score to 0+5=5. The "Reach" parameter may have a weight of 10. When SNE 135 measures the corresponding parameter, the customer experience score is updated to 5+10=15.

After the various parameters are configured using the settings interface 206 as noted above, the contact handling platform 130 analyzes a customer's social media data in terms of the configured parameters. In some implementations, the background processes continuously monitor the customer's activity in the social networks that are tracked, and update the parameter values whenever conditions corresponding to the parameters change. For example, the SNE 135 may continuously check the content of the customer's posting in a social network website and search for mentions of the content provider's brand in these postings.

In some implementations, the social network influence score may be computed continuously in the background. In other implementations, the social network influence score may be computed or updated whenever instructions are encountered in an interaction page for using the social network influence score. The instructions may be configured by the content provider. For example, the content provider may include, in an interaction page, a link to the page that includes the instructions dependent on a customer's social network influence score. Accordingly, the customer's social network influence score is computed or updated whenever the script corresponding to this interaction page is executed as part of the interaction flow for the site.

In some implementations, the content provider may include, in every interaction page associated with the ARS 132, a link to the page that includes the instructions dependent on the customer's social network influence score. In such implementations, the customer's social network influence score is computed or updated after every interaction between the customer and the ARS 132. Based on this computation or update of the customer's social network influence score, the ARM 136 may determine whether to route the customer communications to a human agent after each interaction between the customer and the ARS 132.

FIG. 2C illustrates an example GUI 200 showing the interaction page 240, titled "Route to Agent" and assigned page number 2500, which includes the instructions for routing the customer communications to an agent based on the customer's social network influence score, or the experience score, or both, during normal operation of the interaction site (i.e., no error is encountered). In some implementations, interaction page 240 also may include instructions for enabling recording of customer communications sessions.

During site generation, the content provider may access the page 240 from the "Site Overview" page 201, by clicking on the link shown in the Page Name field 201d that is part of the page flow 202. For example, the content provider may click on the "Route to Agent" page name in the page flow 202 to access the interaction page 240.

In the example shown, the interaction page 240 is generated by the cellular service provider as the content provider for routing the communications of its customers who contact the company's "Customer Support" interaction site. The interaction page 240 includes a list of agents 244, shown in the "Main" tab 242a. Each agent in the list 244 includes an agent name 244a, and a contact point corresponding to each communications mode supported by the interaction site. As discussed previously, the interaction site may support telephone, SMS, email and web chat communications modes. Therefore, for each agent in the list 244 there is a phone number 244b, an email address 244c, a web chat contact 244d and an SMS 244e. In addition, some of the agents have skills 244f assigned to them, which are used when skills-based routing is enabled, which is described in greater detail below.

In some implementations, the content provider, i.e., the cellular service provider in the present example, configures the names and contact information of the agents in the list 244. The agents may be employees of the cellular service provider, or they may be associated with contractors hired by the cellular service provider to provide support services. The agents may be located in the same location, e.g., in an office associated with the cellular service provider, or they may be located in different places, e.g., in different contact centers, as described previously.

In some implementations, at the time that a customer communications is routed to the page 2500, none of the agents in the list may be available to connect to the customer. This may be the case, for example, when the agents are all on a break (e.g., lunch hour), or all the agents who are on duty are engaged in answering other customer communications. To handle such situations, the content provider may configure instructions 246, which specifies the action to take when no agent is available. For example, the cellular service provider may specify that if agents are not available, then the application should send the customer communications to page 9000, titled "Assigned Agent Voicemail." The page 9000 may include instructions that to connect the customer communications to an agent's voicemail, such that the customer may leave a message. Additionally or alternatively, the page 9000 may include other instructions to connect the customer communications to other agent contact points that are associated with the different communications modes implemented by the interaction site (e.g., an e-mail address).

In some implementations, the default strategy on page 240 for connecting customer communications to agents may be that an incoming customer communications is sent to the first available agent. This may be the case, for example, when the customer communications sessions are routed without considering the social network influence score or the customer experience score. In such implementations, the customer communications may be sent to an incoming communications session queue, and available agents are included in an agent queue. The first customer communications from the head of the session queue may be connected to the first agent from the head of the agent queue.

The content provider may configure instructions 250, specifying that if the agent selected for a customer communications does not accept the connection after a number of attempts, then the customer communications should be connected to the next agent from the agent queue. The number of attempts may be a configurable parameter that is specified by the content provider.

The content provider also may configure instructions 252 that specify how the interaction flow should proceed once the communications between a customer and an agent is completed. For example, the cellular service provider may specify that the interaction flow should proceed to the page 10000, titled "Goodbye." The page 10000 may include instructions to end call, with the application (e.g., the ARS 132) sending a greeting to the customer. Additionally or alternatively, the page 10000 may include instructions for the application (e.g., the ARS 132) to query the customer to answer a survey regarding the recent communications session.

In some implementations, the content provider may specify a priority-based routing strategy. This may be enabled through the instructions 254, e.g., when the content provider selects the "Enable Routing Priority" option. When the priority-based routing strategy is used, the customer communications are not connected to available agents using the default strategy described above. Instead, the application determines whether to route incoming communications sessions to the ARS 132 or to an agent based on computing the customer's social network influence score, or customer experience score, or both.

When the content provider selects the "Enable Routing Priority" option, the content provider also selects one of the options specified by the instruction 254a. If the content provider selects the "All Callers" option, then all incoming communications sessions are routed on a priority basis. However, if the content provider selects the "Agent Enabled" option, then human agents are allowed to determine whether to route incoming communications sessions on a priority basis, or to use the default strategy. When the "Agent Enabled" option is selected, then the human agents may be provided with a command option in the GUI shown on the agents' machines, as described in greater detail below.

In addition to selecting one of the options specified by the instruction 254a, the content provider also selects one of the options specified by the instruction 254b. If the content provider selects the "Experience Score driven" option, then incoming communications sessions are routed based on the customer experience score. In such cases, a communications session is initially routed to the ARS 132. The application computes the customer's experience score based on the interaction between the customer and the ARS 132, and accordingly decides whether to route the session to an agent. When routing the communications session to an agent from the ARS 132 based on the customer experience score, the application also may consider the social network influence score to determine particular agents for routing the session, or for determining the placement of the communications session in the session queue when no agents are available to handle the session immediately.

If the content provider selects the "Social Score driven" option in the instruction 254b, then incoming communications sessions are routed based on customers' social network influence scores. In such implementations, the application determines whether to route the incoming communications sessions to an agent or to the ARS 132 based on the customers' social network influence score, as described previously. Additionally, when the application determines to route the communications session to an agent but no agent is immediately available to handle the session, the application places the communications session in the session queue arranged in a priority order based on the customer's social network influence score.

In some implementations, the application also matches the customer communications session to the most suitable agents for handling the session based on the social network influence score. Additionally or alternatively, on one or more factors may be considered for matching the communications sessions to suitable agents, such as the subject matter of the customer communications, agent characteristics such as agent skills or agent scores, and past history of interactions between the customer and the agents, among others. For example, when a customer communicates with the "Customer Support" interaction site, the contact handling platform 130 may determine the reason or subject matter for the call, or certain characteristics of the customer, or both, apart from computing the social network influence score. If a cellular subscriber calls in to the interaction site and says, while interacting with the ARS 132, that "My phone is not working," then the STAM 134 may determine, using speech recognition techniques, that the customer needs technical support. In another case, if the customer calls in and says "I want to upgrade my plan," then the STAM 134 may determine that the customer is seeking sales support. In some implementations, the STAM 134 may determine, using speech recognition techniques, that the customer has a non-native accent, or that the customer is elderly, or some such characteristic. This information may be forwarded to the ARM 136 for selecting the most suitable agent for the particular type of customer communications, or for the specific customer, or both.

In some implementations, the ARM 136 may use the agent skills 244f that are configured by the content provider. For example, the cellular service provider may specify that agent "John Doe" has "tech support" skills, indicating that the particular agent has expertise in handling customer communications for which the subject matter are related to technical support issues. The cellular service provider also may specify that agents "Jane Smith" and "Daisy Gasby" have "sales" skills, indicating that the particular agents have expertise in handling customer communications for which the subject matter are related to sales. Accordingly, the ARM 136 may match the customer who needs technical support to agent "John Doe," and the customer who is seeking sales support to the first available agent between "Jane Smith" and "Daisy Gasby." If the matched agent is not available to take the call, then the ARM 136 attempts to connect to the next agent available with the required skills.

The cellular service provider may specify other skills, such as "high experience" and "low experience," which indicate that the corresponding agents have high expertise and limited expertise, respectively, in handling customer communications. Accordingly, when the ARM 136 tries to find a match for a customer with a high social network influence score, then the ARM 136 may try to find an agent who has high expertise in dealing with customers whose feedback may have high social media impact.

In some implementations, the agent skills 244f configured by the content provider are mapped to the agent scores, or to specific keywords detected in the customer's input, or both. The mapping may be a default mapping provided by the contact handling platform 130, or it may be configured by the content provider. For example, the content provider may configure the skill "high experience" as mapping to an agent score above 67 (on a scale of 1-100, when the agent scores are numerical values), or to a "high" level (when the agent scores are level-based); and the content provider may configure the skill "low experience" as mapping to an agent score below 33 (on a scale of 1-100, when the agent scores are numerical values), or to a "low" level (when the agent scores are level-based). The content provider, i.e., the cellular service provider, may configure the skill "sales" as being a direct match for customer communications associated with the customer's speech in which one or more of the keywords or phrases such as "upgrade," "plan," "sales," or "new phone" are detected. Similarly, the cellular service provider may configure the skill "tech support" as being a hit for customer communications associated with the customer's speech in which one or more of the keywords or phrases such as "phone not working," "signal," or "no connection" are detected.

In some implementations, the content provider may select one of several options for matching customers to agents using the instructions 256. The selected option may be used, for example, when priority-based routing is enabled. The content provider may select an option by clicking on the radio button next to the option. As shown, the options include "Order Entered," "Most Idle Agent," "Hunt/Round Robin," "Least Utilized Agent" and "Agent Scores."

When the "Order Entered" option is selected, the customer communications is matched based on the order the agents are specified by the list 244. The contact handling platform identifies the first agent in the list 244, e.g., "Jane Smith" and selects this agent for routing the customer communications. If agent "Jane Smith" is not available (e.g., the agent is presently handling a customer communications or is away), then the contact handling platform checks whether the next agent specified in the list (e.g., "John Doe") is available, and then the next, and so on.

When the "Most Idle Agent" option is selected, the customer communications is matched to an agent who has not handled a customer session for the longest period, among all the available agents. In some implementations, the contact handling platform may log the times when agents interact with customers. In this manner, the system may have knowledge of when was the last time an agent was engaged in communications with a customer and, accordingly, may compute use this knowledge to compute the idle times for the agents. The contact handling platform may arrange the available agents in an order of decreasing idle times, and match an incoming customer communications to the first agent in the arrangement, i.e., the agent who has been idle for the longest period among the available agents.

When the "Hunt/Round Robin" option is selected, the customer communications is matched to agents using a Round Robin scheduling scheme. In such cases, the contact handling platform schedules the agents as they become available (e.g., in a queue), and selects first available agent from the schedule. If the first agent in the list is not available (e.g., the agent is presently handling a customer communications or is away), then the contact handling platform checks whether the next scheduled agent is available, and then the next, and so on.

When the "Least Utilized Agent" option is selected, the customer communications is matched to an agent who has handled the least number of customer sessions, among all the available agents. In some implementations, the contact handling platform may track how many customer interactions have been handled by each agent. The contact handling platform may arrange the available agents in an order of increasing number of customer interactions handled, and match an incoming customer communications to the first agent in the arrangement, i.e., the agent who has handled the least number of customer sessions among the available agents.

When the "Agent Scores" option is selected, the customer communications is matched to an agent based on the agent scores, which are computed as described in the preceding sections. In some implementations, the contact handling platform arranges the available agents in an order based on the agent scores, e.g., starting with the agent with the highest agent score and ending with the agent with the lowest agent score. The contact handling platform may match an incoming customer communications to the first agent in the arrangement, i.e., the agent who has highest score among the available agents.

In some implementations, the content provider may connect customer communications to agents based on historical match, using the instructions 258. Historical match may be used, for example, when experience score driven routing is enabled in the instruction 254b. The content provider may select the historical match option by clicking on the check box next to "Enable Historical Match" 258.

In some implementations, the content provider may configure instruction 255 to alert agents to turn on recording for communications sessions. The content provider may select option 255a to configure the instruction 255. Based on the selection of option 255a, the instruction 255 may be configured to send an alert message to a human agent to turn on recording for a customer communications session when the customer experience score for the particular communications session is below the value specified by the input field 255b. As shown, the content provider may configure instruction 255 such that the instruction compares the customer experience score to a threshold value of 55%, which is specified by the input field 255b, to determine whether to alert agents to turn on recording of the communications sessions. The threshold value is configured by the content provider by inputting (e.g., typing in) an intended value into the input field 255b. In some implementations, the contact handling platform 130 may provide a default threshold value that may be modified by the content provider.

Figure 3:
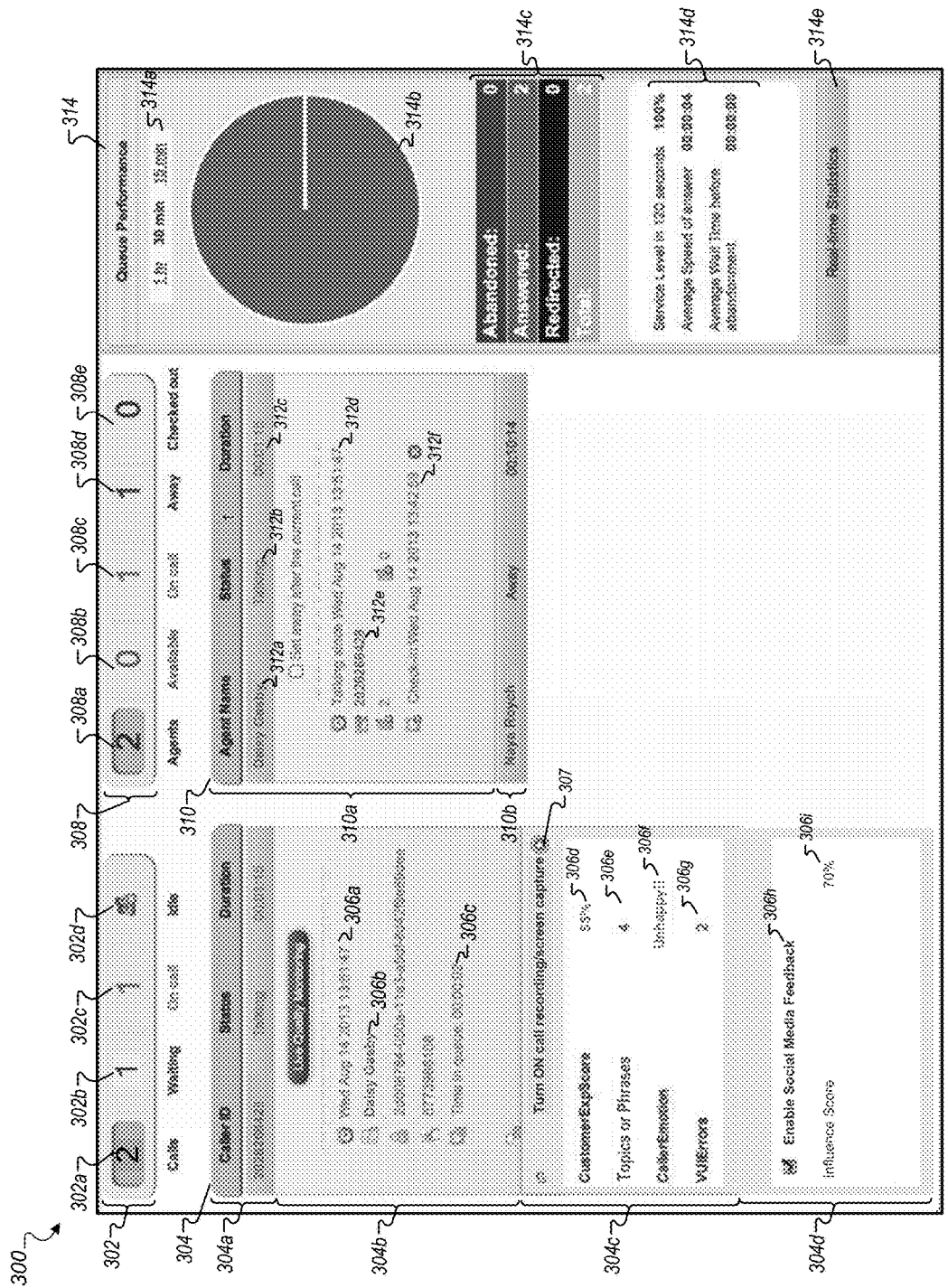
FIG. 3 illustrates an example GUI that is shown to a human agent when customer communications are routed to the agent.

In some implementations, when the ARM 136 selects an agent for handling a customer communications, the information on the communications session is forwarded to the agent's contact point. The information may be displayed to the selected agent, for example, on a computer display coupled to the device used by the agent in answering customer communications. FIG. 3 illustrates an example GUI 300 that is shown to a human agent when customer communications are routed to the agent. The agent may be handling customer communications for an interaction site hosted by the contact handling platform 130. The GUI 300 may be displayed by an application running on a computing device associated with the agent that is connected to the contact handling platform 130, and the application may be displaying information provided by the contact handling platform 130. For example, the application displaying the GUI 300 may be a client application that shows information provided by a server running on the contact handling platform 130, which manages information sent to various agents for the interaction site hosted by the contact handling platform. In some implementations, the GUI 300 may be shown on a web browser running on the agent's computing device. Accordingly, the following sections describe the GUI 300 with respect to the communications system 100. As a specific example, the components of the GUI 300 are described as used by an agent answering customer communications for the interaction site "Customer Support" that is associated with the cellular service provider. However, in other implementations the GUI 300 may be associated with other interaction sites hosted by other platforms or systems.

As shown, the GUI 300 provides information associated with the voice communications mode, e.g., when the customer has called in using a voice communications device and therefore the agent is connected to the call using the voice communications mode. In other implementations, the GUI 300 may provide information for connections in other communications modes, such as SMS, web chat, or email, e.g., when the customer connects to the interaction site using one of these communications modes. In some implementations, the GUI 300 may simultaneously provide information for customer communications made in all the different supported communications modes.

In some implementations, the GUI 300 uses the panel 302 to provide information on the total number of calls 302a for the interaction site that are to be handled by agents, the number of calls that are "On Call" 302c, i.e., connected to agents, and the number of calls that are "Waiting" 302b, i.e., waiting in the call queue for agents to be available for connection. For example, as shown, there are total of two calls, one of which is connected and the other of which is waiting in the call queue. In some implementations, the number of on-duty agents in the call center who are idle is indicated by 302d. The idle agents are not answering any calls currently, nor are they engaged in any other kind of work. Therefore, new incoming calls can be routed to these idle agents.

The panel 304 provides information to the agent who is using the GUI 300 about the current call that the agent is handling. Sub-panel 304a shows the number of the customer's voice communications device (e.g., telephone number "2026266428" as shown), the status of the call (e.g., "Talking," i.e., the call is currently engaged), and the duration of the call, i.e., how long the customer and the agent have been connected. In some implementations, the status of the call may be determined by the STAM 134 by analyzing the participants' speech.

Sub-panel 304b provides miscellaneous bookkeeping information to the agent. For example, the sub-panel 304b indicates the current date and time 306a, the name of the agent 306b who is handling the call indicated by 304a, and how long the call was waiting in the call queue 306c before the call was connected to the agent.

Sub-panel 304c provides information about the customer that are relevant to the call being handled. For example, the sub-panel 304c includes a field 306d showing the customer experience score; a field 306e providing the number of topics or phrases that were detected during the customer's interaction with the ARS 132; a field 306f indicating a parameter "CallerEmotion," which is a measure of the customer's emotional state; and a field 306g showing the number of VUI errors that the customer made while interacting with the ARS 132.

The information provided by the fields 306d, 306e, 306f and 306g are measured by the STAM 134 and the ARM 136 during the customer's interaction with the ARS 132, in a manner described previously. In some implementations, CallerEmotion is a mapping of the customer experience score to a metric that may be more easy for the agent to understand, in comparison to the numerical value of the customer experience score. For example, the ARM 136 may map customer experience score above 67% to CallerEmotion "Happy" or "Satisfied," customer experience score in the range 67%-33% to CallerEmotion "Unhappy" or "Dissatisfied" and customer experience score below 33% to CallerEmotion "Angry."

The information provided by 304c may help the agent infer the customer's state of mind, so that the agent may be prepared to engage the customer with a suitable degree of care. For example, as shown the sub-panel 304c indicates that the customer with whom the agent is presently interacting has an experience score that is 55% and accordingly the customer is in an unhappy emotional state. Part of the reason for the low customer experience score may be that the customer made 2 VUI errors in interacting with the ARS 132. The customer also spoke during interacting with the ARS 132, and the customer's speech included 4 topics or phrases that were detected by the STAM 134 as matching keywords or phrases configured by the content provider. Presumably, correlating to the customer's emotional state, the topics or phrases detected in the customer's speech indicated the customer's dissatisfaction or unhappiness during the interaction with the ARS 132. Knowing this information, the agent may strive to be more patient while engaging the customer, or the agent may be conciliatory in an attempt to mollify the customer, or both. For example, the agent may start the interaction with the customer with an apology, such as by saying "I see that you were having a hard time," or "Do not worry—I will take care of your issues," or some other suitable comments.

Sub-panel 304d provides information about the customer's social network influence score that is relevant to the call being handled. In some implementations, the sub-panel 304d includes an option 306h for the agent to enable social media feedback. The option 306h gives the agent the control to determine whether to prioritize incoming calls, e.g., the calls that are waiting in the agent's call queue, based on the social network influence score(s) of the customers associated with the calls. This option may be provided when the content provider selects the option "Agent Enabled" in the instruction 254a while enabling priority-based routing 254.

When incoming calls are routed based on the customers' social network influence scores, e.g., based on the selection of the option "Social score driven" in the instruction 254b, the field 306i in the panel 304d shows the social network influence score of the customer associated with the current call. The information provided by the field 306i is measured by the SNE 135 when the call is established with the contact handling platform 130, in the manner described previously. The information provided by 306i may help the agent infer how important the customer might be from the perspective of social media feedback, so that the agent may be prepared to engage the customer with a suitable degree of care. For example, as shown the field 306i indicates that the customer with whom the agent is presently interacting has social network influence score that is 70%, which may map to a high impact level of the customer's activity in the corresponding social network. Knowing this information, the agent may strive to be more diligent and responsive while engaging the customer. This may be made with the expectation that, if the customer posts feedback about the call on the social network, the feedback will be positive. Due to the high impact of the customer's activity in the social network, the customer's feedback may influence other users of the social network to initiate new transactions with the content provider, or improve the content provider's reputation, or both.

The panel 304 also may be used to display an alert message 307 to the human agent regarding recording the current call that the agent is handling. If the current call is not being recorded, then the alert message 307 may ask the agent to turn on call recording, or screen capture, or both, for the call, as shown.

In some implementations, the alert message 307 may be animated on the GUI 300, e.g., flashing or blinking, to draw the attention of the human agent. The alert message 307 may be animated for a predetermined time period. Once the time period expires, the animation may stop, but the alert message may remain displayed if the agent has not turned on call recording, or screen capture, or both. Alternatively, the alert message may continue to be animated until the agent turns on call recording, or screen capture, or both. The alert message 307 may cease to be displayed when the agent turns on call recording, or screen capture, or both, or when the call is terminated.

In some implementations, the alert message may be shown to the human agent when the content provider has configured instruction 255 in the interaction page 240. The communications session may have been routed to the human agent viewing the GUI 300 when the customer experience score is below the threshold specified by input field 232b. However, the customer experience score is higher than the threshold specified by input field 255b, such that automatic recording of the call by the recording module 137 is not triggered. In such cases, the message 307 may alert the agent to turn on call recording/screen capture for the call, such that the call may be recorded even if automatic recording by the recording module 137 is not performed.

The panel 308 provides a snapshot of all the agents who are currently on duty for answering calls from customers of the interaction site. The total number of agents who are assigned for answering calls for the interaction site is shown by the field 308a; the number of agents who are available to accept a call is shown by 308b; the number of agents who are "On call," i.e., currently engaged in calls with customers, is shown by 308c; the number of on-duty agents who are away (e.g., on a break) is shown by 308d; and the number of agents how are "Checked Out," i.e., currently off duty is indicated by 308e. For example, as shown, there are total of two agents assigned to the particular interaction site associated with the GUI 300. One of agents is connected to a caller while the other agent, even though on duty, is away. Therefore, zero agents are available to accept incoming calls and zero agents are off duty.

Panel 310 provides more detailed information about activities of the agents who are on duty. For example, sub-panel 310a shows information on one agent, such as the agent's name 312a, the status of the agent 312b (e.g., the agent is "Talking," i.e., engaged in a call), and how long the agent has been in the current status 312c. Sub-panel 304a may provide other information to the agent. For example, 312d indicates the date and time at which the agent commenced the current call engagement. The number of the caller corresponding to the current call is indicated by 312e. The time of the agent's "Check-in," i.e., the time the agent reported for duty, is shown by 312f.

There may be other sub-panels present displaying information on other agents who are on duty. For example, as shown, sub-panel 304b provides information on the second agent who is currently on duty. The sub-panel provides the agent's name, the status of the agent 312b (e.g., the agent is "Away," i.e., not engaged in a call and not available to accept new calls), and how long the agent has been in the current status.

The panel 314 shows information on the "Queue Performance" of the agent who is using the GUI 300. That is, the panel 314 provides metrics indicating the agent's performance during the current work session of the agent. As shown by 314a, the metrics can be viewed in different time interval granularities, such as 1 hour, 30 minutes or 15 minutes. The agent can select the desired time interval by clicking on the corresponding link in 314a.

The pie chart 314b provides a graphical view of the status of the customer communications that have been handled by the agent in the time interval selected in 314a. The same status is provided in textual form by the field 314c. For example, as shown, in the last 30 minute time interval (that is selected in 314a), the agent has successfully answered 2 calls, which is indicated by the "Answered" stripe in 314c. No call has been abandoned, i.e., the caller has hung up without completing the transaction, the caller disconnected while waiting for the agent to answer the call request, or the call got disconnected for some other reason. This is indicated by the "Abandoned" stripe in 314c. No call has been redirected, i.e., forwarded to a supervising agent who presumably is better suited to handle the issues raised in the call. This is indicated by the "Redirected" stripe in 314c. Therefore, as indicated by the "Total" stripe in 314c, of a total of 2 calls handled by the agent in the last 30 minute time interval, both calls were processed successfully.

The field 314d displays statistics of the agent's performance, with 314e indicating that the statistics are real-time statistics, i.e., the values are updated in real time as the agent interacts with the customers. For example, 314d indicates that the agent's "Service Level in 120 seconds" is 100%, i.e., in the last 120 seconds the agent was fully engaged in communicating with customers. 314d also indicates that the agent's "Average Speed of answer" is 4 seconds, i.e., the average time between a call request received by the agent and the call accepted by the agent is 4 seconds. The "Average Speed of answer" provides a measure of how quickly the agent answers call requests. Lower times indicate better performance of the agent. In addition, 314d indicates that the agent's "Average Wait Time before abandonment" is 0 seconds, i.e., no call handled by the agent was abandoned.

In this manner, as described in the preceding sections, a content provider may easily design an interaction site by using the GUI 200 that is accessed using the application builder 170. While designing the interaction site, the content provider may specify instructions and parameters for measuring the customers' social network influence scores and for routing the customer communications to human agents if the social network influence scores are above thresholds specified by the content provider. Additionally or alternatively, the content provider may specify instructions for measuring the satisfaction levels of the customers when they interact with the site and for routing the customer communications to live agents if the customer satisfaction levels fall below thresholds configured by the content provider.

The interaction site is hosted by the contact handling platform 130 who processes the customer communications and determines, upon processing the content provider-configured instructions, whether to route the communications to agents, e.g., in the call centers 140, or 150, or both. When the customer communications are routed to the agents, the contact handling platform provides information on the customer communications to the agents via the GUI 300 such that the agents are empowered to handle the customer communications with the suitable amount of care.

The systems and processes described in the preceding sections may allow a content provider to design a site that leads to increased customer satisfaction, or more positive feedback about the content provider's brand in online media, or both, thereby leading to greater business opportunities for the content provider. For example, based on the routing strategies specified by the instructions, customer communications may be handled by agents when a customer has high impact in social network websites, or when a customer is having difficulty with the automated response system, or both. In addition, the customer communications may be routed to the agent who is most suitable for handling the particular customer, thereby leading to a satisfied customer. The systems and processes also may lead to increased agent satisfaction. By ensuring that an agent is provided with information on a customer's satisfaction level, or emotional state, or both, agents can be ready to engage the customer with the right frame of mind.

FIGS. 4A-4E illustrate examples of pages of a GUI 400 that are shown to a customer for providing social media feedback about a customer communications session that is handled by a contact handling platform. The GUI 400 may be configured by a content provider using the application builder 170 as part of creating and managing an interaction site hosted by the contact handling platform 130. The GUI 400 may be shown on a display of the communications device 110 used by the customer in establishing a communications session with the interaction site. Accordingly, the following sections describe the GUI 400 with respect to the communications system 100. As a specific example, the components of the GUI 400 are described as used by cellular subscribers of the "Exemplary Cellular" service provider, after the customers have contacted a customer service interaction site of the cellular service provider and agreed to provide feedback about their experiences during the communications sessions with the customer service. However, the GUI 400 may be configured by other systems, and accordingly seen by customers of other content providers.

Figure 4B:
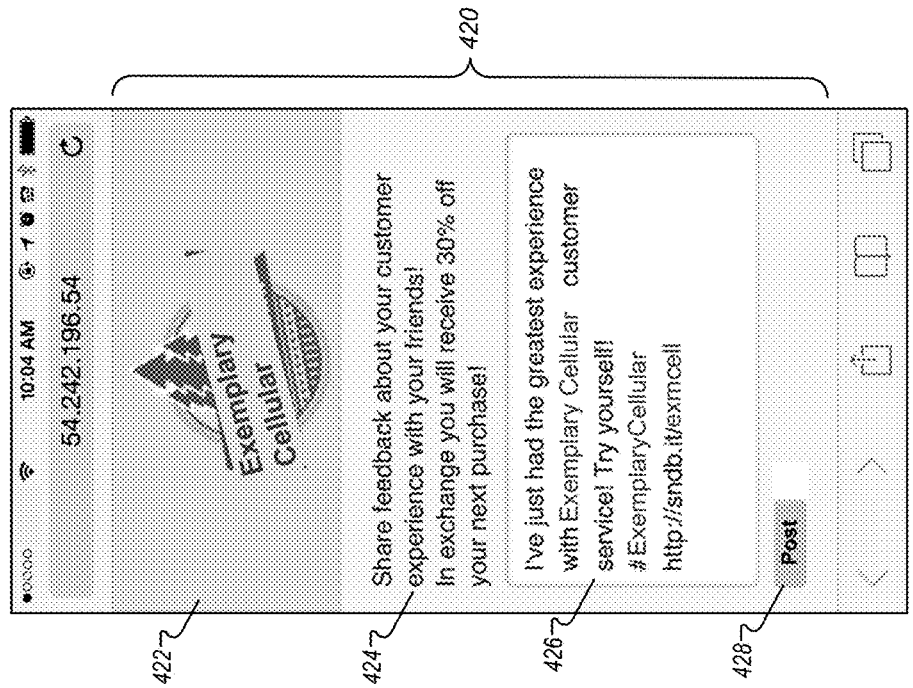
Figure 4A:
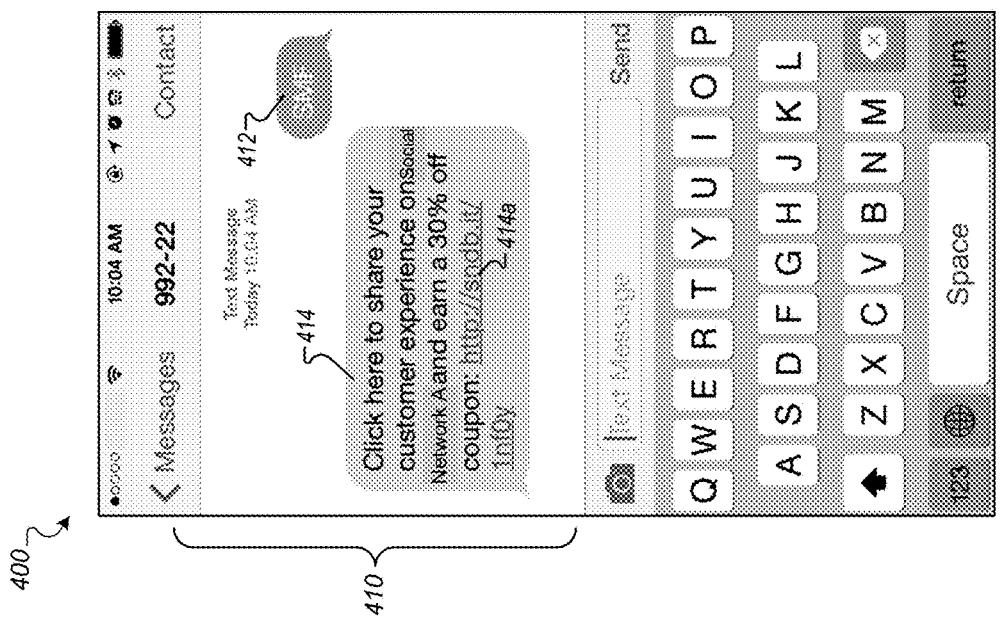

FIG. 4A illustrates an example page 410 that is displayed on the customer's communications device 110, showing a message 414 that is sent to a customer for providing social media feedback. The message 414 may be sent after the customer has agreed to provide feedback regarding the customer's experience during a recent communications session with the customer service interaction site of Exemplary Cellular. As shown, the message 414 is sent as a text message. However, the message also may be sent using other modes in other implementations, e.g., as an email or in a phone call. In some implementations, the text message 414 may be conveyed after the customer has sent a text message 412 to a number associated with customer service interaction site, indicating the customer's willingness to provide feedback.

As shown, the text message 414 includes information requesting the customer to share her experience on "Social Network A," and incentivizes the customer with a "30% off" coupon as a reward for providing the feedback. The message 414 further includes a hyperlink 414a to a webpage where a prepopulated feedback form is available for the posting to "Social Network A."

When the customer selects the hyperlink 414a, the webpage 420 is displayed on the customer's communications device 110, as illustrated by FIG. 4B. The webpage 420 may include a graphic logo 422 or other information identifying the brand of the product or service associated with the feedback form, e.g., a logo for Exemplary Cellular, as shown. The webpage 420 also may include a message 424, which may be similar to 414, i.e., the message 424 may request the customer to share feedback about her customer experience on a social media network. The message 424 may further include an incentive of "30% off" the customer's next purchase for providing the feedback.

The webpage 420 includes a feedback form 426 for posting on the social network website. As shown, the feedback form may be prepopulated with content for posting on the social network website. As noted previously, the feedback form may be generated and prepopulated with the content by the SNE 135, or some other suitable component of the contact handling platform 130. In some implementations, the content with which the feedback form 426 is prepopulated may be configured by the content provider, e.g., at the time of designing the Exemplary Cellular customer service interaction site. The webpage 420 also includes a button 428 for the customer to post the feedback on the social network website.

In some implementations, when the content provider designs the interaction site, the contact handling platform 130 links the interaction pages to the selected social networks by using APIs provided by the social network sites. Accordingly, when the customer selects the button 428, a webpage 430 that is associated with the chosen social network, e.g., "Social Network A," is accessed using the embedded APIs and shown on the display of the communications device 110, as illustrated by FIG. 4C. The webpage 430 provides a form 432 for posting user content on the selected social network. As shown, the form 432 may be automatically populated with the feedback content from the feedback form 426, which may be conveyed from the webpage 420 to the webpage 430 using the APIs provided by the associated social network site.

The webpage 430 also includes a button 434 for the customer to post the content of the form 432 on the social network website. In some implementations, the customer may modify the content of the form 432 before posting to the social network website. Accordingly, the customer may change the prepopulated feedback content that is provided by the contact handling platform 130 before posting the feedback on the social network website.

When the customer selects the button 434, webpage 440 that is associated with the selected social network is presented on the display of the communications device 110, as shown by FIG. 4D. The webpage 440 shows the content 442 posted by the customer on the social network website. As shown, the content 442 provides feedback about the customer's experience during a recent interaction with the customer service of Exemplary Cellular. The content 442 also includes a link 444 to a website associated with Exemplary Cellular. Other users of the social network who see the customer's post can visit Exemplary Cellular site by selecting the link 444. The webpage 430 also includes username or handle 446 that is used by the customer in the social network site.

In some implementations, the content may be marked as a "sponsored content," which may indicate that content posted by the customer, i.e., the feedback, has been sponsored by the brand that is mentioned in the content. For example, the content 442 may include an additional indication, such as an icon, which indicates that the content 442 has been sponsored by Exemplary Cellular. Sponsored contents may be the indicated, for example, when the contact handling platform offers the customer a reward coupon as an incentive when the request for providing feedback is made. Accordingly, the posted content may be marked as sponsored such that other users viewing the posted content may be made aware that the positive feedback in the content is not necessarily an impartial feedback about the brand mentioned in the post. Instead, the customer is being rewarded by the brand for posting the positive feedback.

After the content 442 with the prepopulated feedback is posted on the social network website, the GUI on the customer's communications device 110 may revert to the page 430, as shown by FIG. 4E. The social network sends an acknowledgement for the posted content 442. In some implementations, when the acknowledgement is received at the contact handling platform 130, the SNE 135 may reward the customer for providing the feedback, if such an incentive was offered. For example, a reward coupon may be sent to the customer. The SNE may inform the customer about the reward coupon that is sent by presenting an alert message 452 on the display of the customer's communications device, as shown by FIG. 4E.

Figure 5:
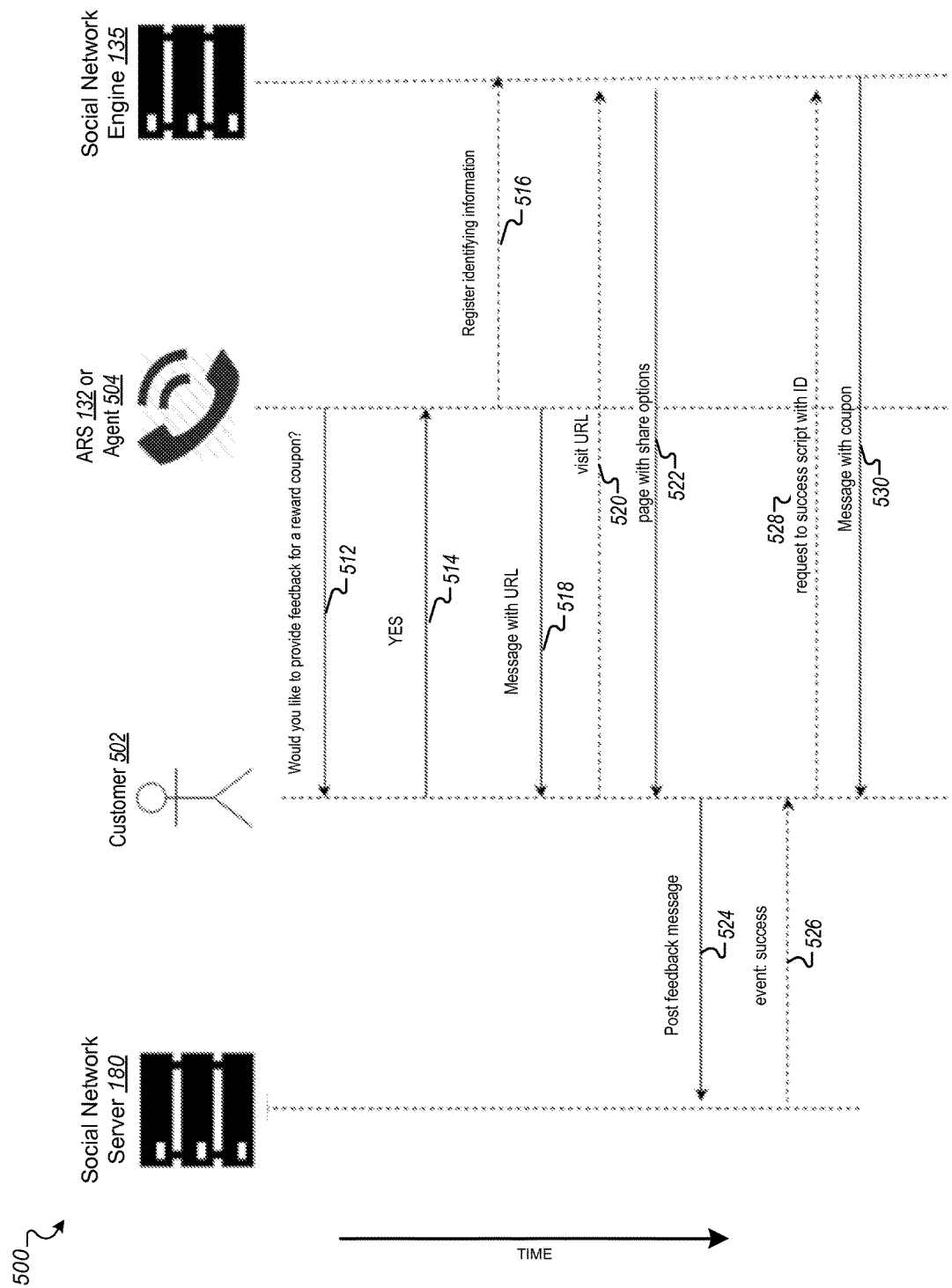
FIG. 5 illustrates an exemplary message flow between a customer, a contact handling platform and a social network website.

FIG. 5 illustrates an exemplary message flow 500 between a customer, a contact handling platform and a social network website. The customer may be associated with a communications session that is established with an interaction site managed by the contact handling platform. The message flow 500 may correspond to a feedback request made by the contact handling platform to the customer, and a feedback that is accordingly posted by the customer on a social network website. For example, the customer may be a user of the communications device 110 who establishes a communications session with an interaction site. The interaction site may be hosted by the contact handling platform 130, which may request the customer to provide feedback about the customer's experience during the communications session. The contact handling platform may provide a prepopulated feedback form to the customer, and the customer may post the feedback on a social network website using the customer's user account on the social network website. Accordingly, the following section describes the message flow 500 with reference to components of the system 100. However, the message flow also may correspond to other systems or system configurations.

In some implementations, the message flow 500 involves a customer 502 who uses a communications device 110 to establish a communications session with an interaction site hosted by the contact handling platform 130. The communications session may be handled by the ARS 132, or a human agent 504, or both. The human agent 504 may be one of the human agents 140_1, 140_2, 140_N, 150_1, 150_2, or 150_N. During the communications session, the ARS 132/agent 504 requests the customer 502 to provide feedback about the customer's experience during the communications session, offering an incentive for providing the feedback. For example, the ARS 132/agent 504 sends message 512 to the customer 502, inquiring, "Would you like to provide feedback for a reward coupon"?

The customer 502 may agree to provide feedback by sending the message 514 to the ARS 132/agent 504. Upon receiving the message 514, the ARS 132/Agent 504 triggers the SNE 135 to interact with the customer for generating and posting the feedback on a social network website. For example, as shown by 516, the ARS 132/agent 504 registers with the SNE 135 the customer's identifying information, such as the calling number of the communications device 110, or the customer's email address, or some other suitable information.

The SNE 135 may store the customer's identifying information in local storage, such as the data store 138. The SNE also generates a webpage that includes a feedback form with prepopulated content. The webpage is hosted on a web server associated with the contact handling platform 130.

In some implementations, the generated webpage includes tracking information, such as a token, that uniquely associates the webpage or the feedback form, or both, with the customer's identifying information. The tracking information may be useful for the SNE 135 to determine whether the feedback is actually posted by the customer on a social network website. For example, an acknowledgement received from the social network website for a posted feedback may include the tracking information. The SNE can match the tracking information from the acknowledgement to a customer's identifying information stored by the SNE to determine which customer posted the particular feedback.

Additionally or alternatively, the tracking information also may associate the webpage/feedback form to the particular communications session. The SNE can determine, based on the tracking information extracted from a received acknowledgement, the communications session for which the corresponding feedback was posted. This may be useful when a particular customer posts feedbacks for multiple communications sessions, allowing the SNE to associate different feedbacks that are posted by the same customer with different communications sessions.

The ARS 132/agent 504 sends message 518 to the customer 502 with the uniform resource locator (URL) or web address of the webpage that includes the feedback form. For example, the ARS 132/agent 504 may send the message 414 including the web address 414a to the customer's communications device. Upon receiving the message 518, the customer 502 selects the included URL and visits the webpage hosted by the contact handling platform 130 that includes the prepopulated feedback form, as shown by 520. For example, the customer may click on the web link 414a included in the message 414.

The SNE 135 sends message 522 in response to the customer selecting the URL included in the message 518. The message 522 includes the webpage with the prepopulated feedback form along with one or more options for sharing the webpage, such as message posting button 428. The webpage also may embed the tracking information for the SNE to associate the posted feedback with the customer's identifying information stored by the SNE. The message 522 is received at the customer's communications device and the webpage with the prepopulated feedback form, such as the webpage 420, is loaded and displayed by a web browser application on the customer's communications device.

The customer 502 sends message 524 to the social network server 180 to post the feedback message. For example, the customer selects the option 428 from the webpage 420 and accesses the webpage 430 of the social network website that is hosted by the server 180. The webpage 430 is displayed by the web browser application on the customer's communications device. The customer selects the button 434 to post the content 432, which includes the prepopulated content from the feedback form 426, to the social network website.

If the content with the feedback is successfully posted on the social network website, the server 180 sends an acknowledgement, e.g., event success message 526, to the customer's communications device 110. The acknowledgement message is processed by the web browser application on the customer's communications device. Instructions included in the web browser application, e.g., JavaScript™ code, forwards the acknowledgement message to the contact handling platform 130. For example, the customer's communications device sends message 528 to the SNE 13. The message 528 includes the acknowledgement from the server 180 of the successful posting of the feedback content on the social network website. The message 528 also includes the username or handle used by the customer 502 to post the feedback content on the social network website. The username or handle is received from the server 180 as part of the acknowledgement. The message 528 also includes the content of the post that is successfully published on the social network website.

The SNE 135 processes the message 528 upon receipt. For example, the SNE extracts the tracking information from the content of the post sent with the message 528, and accordingly determines the relevant customer's identifying information stored by the SNE. The SNE associates the customer's identifying information with the social network username or handle obtained from the message 528, and stores the mapped information, e.g., in data store 138.

If the customer had been incentivized with a reward offer for posting the feedback, e.g., at the time of making the request 512, then the SNE 135 sends message 530 to the customer that includes the reward coupon. For example, the SNE triggers the display of alert message 452 on the customer's communications device, indicating that a reward coupon has been sent to the customer for posting the feedback on the social network website.

Figure 6:
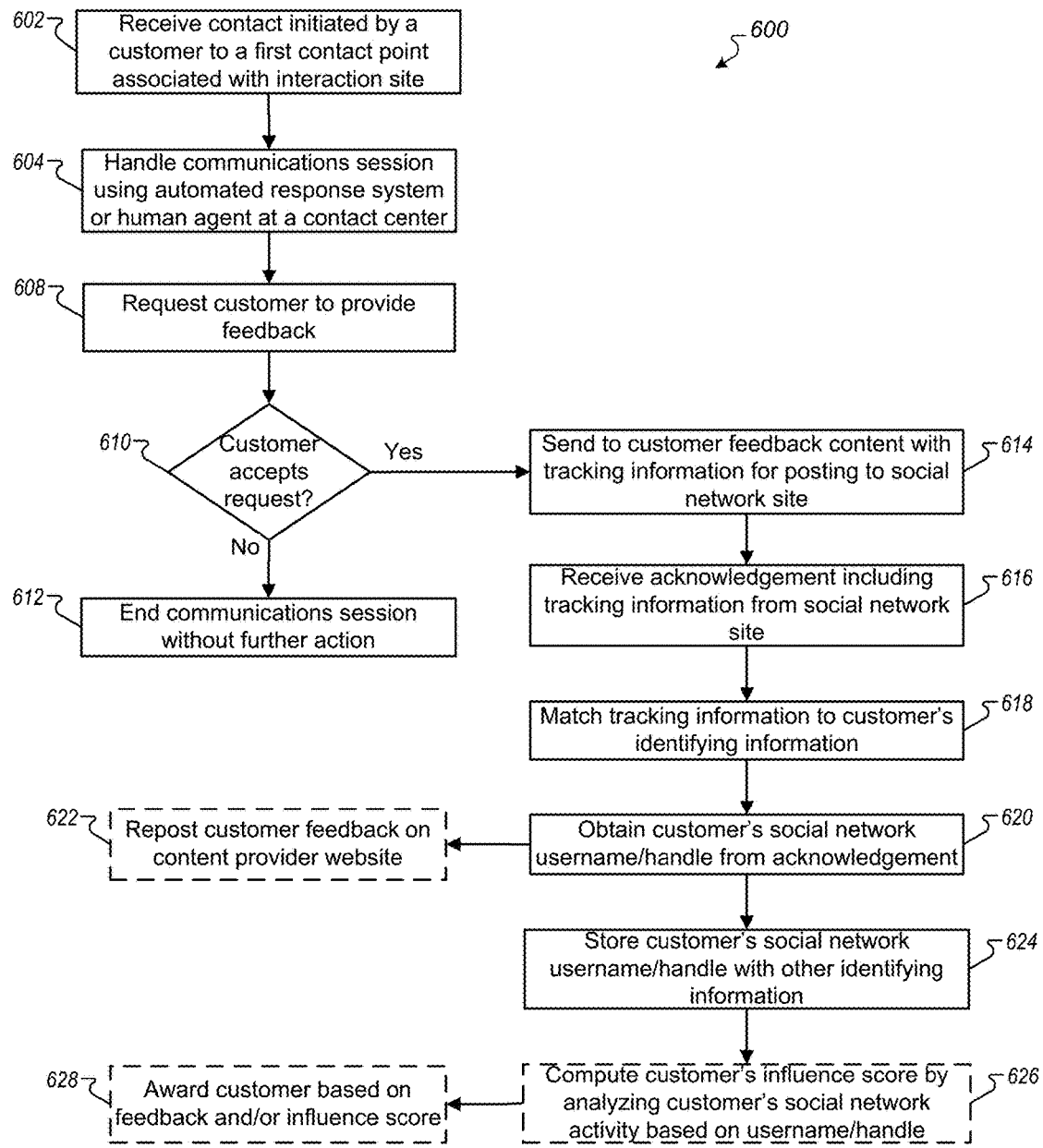
FIG. 6 is a flow chart illustrating an example of a process implemented by a communications system for posting feedback on social media network about customers' communications sessions to an interaction site handled by a contact handling platform.

FIG. 6 is a flow chart illustrating an example of a process 600 implemented by a communications system for posting feedback on social media network about customers' communications sessions to an interaction site handled by a contact handling platform. The process 600 may be used for requesting that a customer provide social media feedback for a communications session with an interaction site hosted by the contact handling platform 130. The process 600 also may be used for obtaining a customer's provide social network username or handle when the customer posts feedback on the social network website. This may be the case, for example, when the customer's social network username or handle has not been registered by the contact handling platform 130 during a previous communications session. Accordingly, the following section describes the process 600 as being performed by components of the system 100. However, the process 600 may be performed by other systems or system configurations.

In some implementations, the process 600 is implemented by components of the contact handling platform working in conjunction with one another, such as the ARS 132, the STAM 134, the SNE 135, the ARM 136 and the data store 138. These components use one or more processors included in the contact handling platform to execute the instructions configured by a content provider that are stored in the data store (e.g. the instructions 139), thereby hosting the interaction site associated with the content provider, and processing customer communications to the interaction site, as described by the process 600. In some implementations, the contact handling platform may simultaneously host multiple interaction sites that are associated with the same content provider, or different content providers.

At 602, the contact handling platform receives a contact initiated by a customer to a first contact point associated with the interaction site. For example, a cellular customer for "Exemplary Cellular" company may call a customer service telephonic number (e.g., "1-800-123-4567") that is associated with the cellular company's "Customer Support" interaction site. The contact is received at the contact handling platform 130. Initially, the call is answered by the ARS 132, which determines that the communications session is intended for the "Customer Support" interaction site based on identifying the telephonic number being called. Since the communications mode used is telephonic, the ARS 132 also may determine that the customer's communications device (e.g., 110) is voice-enabled.

At 604, the contact handling platform handles the communications session using the automated response system or a human agent at a contact center. For example, the contact handling platform may initially process the contact using the ARS 132. During the interaction between the ARS 132 and the customer, the contact handling platform may compute the customer's experience score and accordingly decide whether to route the contact to a human agent at a contact center, or continue the call with the ARS 132. In some implementations, if the customer experience score is above a predetermined threshold value, indicating that the customer's satisfaction level based on the interaction with the ARS 132 is high, then the contact handling platform continues the interacting using the ARS 132. However, if the customer experience score is below the threshold, then the contact handling platform routes the contact to an agent at a contact center, e.g., one of the agents 140_1, 140_2, or 140_N at contact center 140.

At 608, the contact handling platform requests the customer to provide feedback. For example, the ARS 132 or the human agent, depending on who is interacting with the customer, may ask whether the customer would like to post feedback in a social media network about the customer's experience during the current communications session.

In some implementations, the contact handling platform may make the request for feedback based on checking the customer experience score. If the customer experience score is low, indicating that the customer is dissatisfied during the communications session, then the contact handling platform may not make the request. This may be the case because a dissatisfied customer may be more likely to post a negative feedback on the social network website and thereby negatively impact the reputation of the brand associated with the interaction site.

In some implementations, while making the request to provide feedback, the contact handling platform may incentivize the request. For example, as described previously, the contact handling platform may offer the customer a reward coupon if the customer provides feedback on social media.

At 610, the contact handling platform checks whether the customer accepts the request to provide feedback. For example, the ARS 132 or the agent who is interacting with the customer checks the customer's response when the request is made. Additionally or alternatively, the SNE 135 checks whether a message, such as 412 or 518, is received from the customer's communications device 110.

If the customer does not accept the request to provide feedback, then the contact handling platform ends the communications session without further action, at 612. For example, if the customer answers in the negative to the request from the ARS 132 or the agent, then the ARS 132 or agent continues the communications session without taking further actions regarding the feedback, and the contact is terminated when the customer's requirements during the communications session have been addressed.

If the customer accepts the request to provide feedback, then at 614 the contact handling platform sends to the customer feedback content with tracking information for posting to the social network website. For example, the SNE 135 generates a webpage, e.g., 420, which includes prepopulated feedback content and embeds tracking information, such as a token, to associate the posted feedback with the customer's identifying information, such as calling number or email address, known to the contact handling platform. The contact handling platform, e.g., the ARS 132 or the agent or the SNE 135, sends a message, such as 412 or 518, to the customer's communications device 100 with the URL of the webpage generated by the SNE 135. The customer visits the webpage following the URL, and posts the prepopulated feedback content on one or more social network websites.

At 616, an acknowledgement, including the tracking information, is received at the contact handling platform from the social network website. For example, when the customer's feedback is successfully posted on the social network website, the server hosting the social network site, such as server 180, sends an acknowledgement message, e.g., message 526, to the web browser on the customer's communications device. The web browser on the customer's communications device forwards the acknowledgement message to the SNE 135. The message forwarded by the web browser includes the customer's social network username or handle that is received with the acknowledgement from the social network server, and the feedback content, including the embedded tracking information, posted on the social network site.

At 618, the contact handling platform matches the tracking information to the customer's identifying information. For example, the SNE 135 extracts the tracking information from the message received from the customer's communications device. The SNE 135 maps unique markers included in the tracking information to the customer's identifying information that is stored by the SNE 135, such as the contact number of the communications device 110, or the customer's email address, among others.

The contact handling platform obtains the customer's username or handle from the acknowledgement at 620. For example, the SNE 135 obtains the customer's social network username from the acknowledgement message that is sent by the social network server 180, and forwarded to the contact handling platform 130 by the customer's communications device 110.

In some implementations, the contact handling platform optionally reposts the customer's feedback on the content provider's website at 622. For example, the SNE 135 obtains, from the acknowledgement message, the content of the post made by the customer on the social network website. The SNE 135 posts this content on the content provider's support website. This may be the case, for example, when the customer's social media post includes information that may be useful to other customers of the content provider's product or service. For example, the customer's social media post may include troubleshooting information about some problem that the customer had faced, and which was successfully resolved by the agent during the customer's communications session with the interaction site. In some implementations, the SNE 135 may repost the content in this manner if the content provider has configured the interaction site to include this feature.

At 624, the contact handling platform stores the customer's social network username or handle with other identifying information. For example, the SNE 135 associates the customer's contact information, such as the calling number of the communications device 110 or the customer's email address, with the customer's social network username obtained from the acknowledgement message. The SNE 135 stores the customer's contact information with the customer's social network username in the contact handling platform's storage, e.g., data store 138. The stored information may be useful for subsequent communications sessions involving the same customer; during such sessions, the SNE 135 may retrieve the stored information and compute the customer's social network influence score using the retrieved social network username. In this manner, the contact handling platform obtains a customer's social network username/handle and associates the username/handle with the customer's contact information.

During the current communications session, in some implementations the contact handling platform optionally computes, at 626, the customer's social network influence score by analyzing the customer's social network activity based on the customer's social network username or handle. For example, the SNE 135 accesses the customer's social network posts and other publicly-available information using the customer's social network username obtained from the acknowledgement message. The SNE 135 uses APIs provided by the social network site to retrieve the customer's social network information.

The SNE 135 then analyzes the customers' social network information and measures values of various parameters configured by the content provider, e.g., using the settings interface 206. For example, the SNE 135 measures values for one or more of the parameters "Volume," "Reach," "Influence," "Engagement," "Share of Contribution," "Category-based" and "Subscribed Communities."

The SNE 135 computes the customer's social network influence score based on the measured parameter values. In some implementations, the SNE 135 assigns different weights to the different parameters for computing the social network influence score. As noted previously, the weights may be based on the weights 208a configured by the content provider using the settings interface 206, which reflect the relative importance of different parameters to different content providers.

In some implementations, at 628 the contact handling platform optionally awards the customer based on the feedback and/or the social network influence score. For example, if the contact handling platform 130 had incentivized the feedback request with a reward offer, then the SNE 135 may send a message, such as message 530, to the customer's communications device 110.

In some implementations, the SNE 135 may analyze the content of the feedback posted by the customer and send the reward based on the positivity of the feedback. For example, if the customer posted a negative feedback, then the SNE may not send the reward coupon.

In some implementations, the SNE 135 may send the reward based on determining the impact of the customer's social media feedback. For example, the SNE 135 may compare the computed influence score to a predetermined threshold value. A value of the influence score above the threshold might indicate a high impact of the customer's social network post, i.e., a greater number of users of the social network would read the customer's post and might generate business for the content provider's company. On the other hand, while a value of the influence score below the threshold might indicate a low impact of the customer's social network post. The SNE 135 might send the reward coupon to the customer only if the social network influence score is above the threshold value. The threshold value may be configured by the content provider, or it may be predetermined by the contact handling platform.

Figure 7:
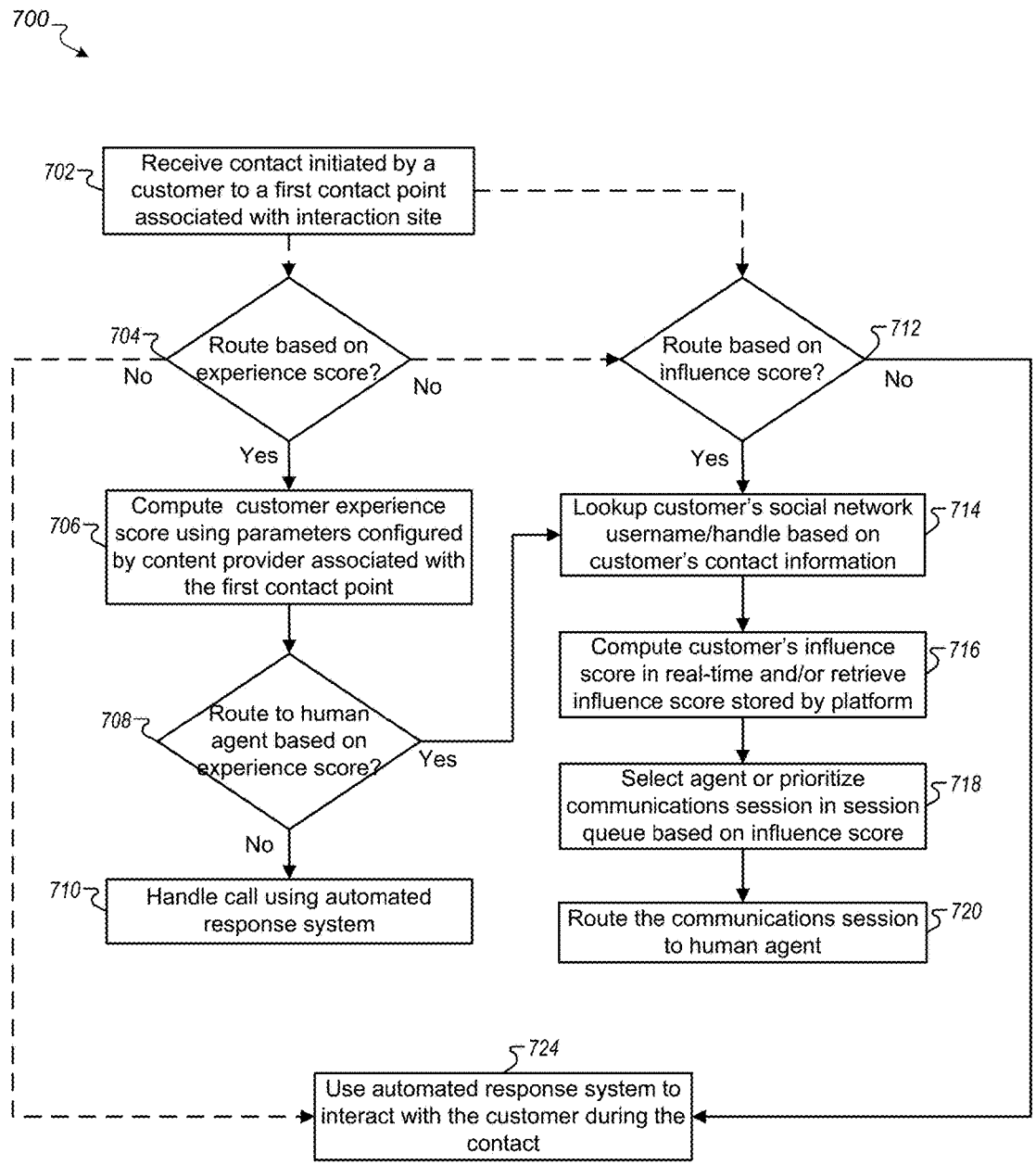
FIG. 7 is a flow chart illustrating an example of a process implemented by a communications system for routing customers' communications sessions to an interaction site based on the customer's social network influence score, or experience score, or both.

FIG. 7 is a flow chart illustrating an example of a process 700 implemented by a communications system for routing customers' communications sessions to an interaction site based on the customer's social network influence score, or experience score, or both. The process 700 may be used by the contact handling platform 130 for routing a communications session established with an interaction site hosted by the contact handling platform 130. Accordingly, the following section describes the process 700 as being performed by components of the system 100. However, the process 700 also may be performed by other systems or system configurations.

In some implementations, the process 600 is implemented by components of the contact handling platform working in conjunction with one another, such as the ARS 132, the STAM 134, the SNE 135, the ARM 136 and the data store 138. These components use one or more processors included in the contact handling platform to execute the instructions configured by a content provider that are stored in the data store (e.g. the instructions 139), thereby hosting the interaction site associated with the content provider, and processing customer communications to the interaction site, as described by the process 700. In some implementations, the contact handling platform may simultaneously host multiple interaction sites that are associated with the same content provider, or different content providers.

At 702, the contact handling platform receives a contact initiated by a customer to a first contact point associated with the interaction site. For example, a customer for "Exemplary Cellular" company may call a customer service telephonic number (e.g., "1-800-123-4567") that is associated with the cellular company's "Customer Support" interaction site. The call is received at the contact handling platform 130. Initially, the communications session is handled by the ARS 132, which determines that the call is intended for the "Customer Support" interaction site based on identifying the telephonic number being called. Since the communications mode used is telephonic, the ARS 132 also may determine that the customer's communications device (e.g., 110) is voice-enabled.

Upon receiving the contact at 702, the contact handling platform may process the associated communications session in one of several different alternative ways, which is indicated by the dashed flows proceeding from 702. In some implementations, the contact handling platform first checks whether to route the communications session based on the customer experience score, as shown at 704. For example, the ARM 136 checks whether the content provider has configured the instruction 254 to enable priority-based routing. If the content provider has enabled priority-based routing, then the ARM 136 checks whether the content provider has selected "Experience Score driven" routing using the instruction 254*b*.

In such implementations, if the contact handling platform determines, upon performing the check at 704, not to route the communications session based on the customer experience score, then again the process may flow in one of several alternative ways, which is indicated by the dashed "No" flows from 704. In some implementations, upon determining at 704 not to route the communications session based on the customer experience score, the contact handling platform uses the automated response system to interact with the customer during the contact, at 724. For example, the ARM 136 may determine that the customer has not enabled priority-based routing using instruction 254. Then then the contact handling platform 130 does not route based on the customer experience score. Instead, the communications session may be handled by the ARS 132. In some other implementations, upon determining at 704 not to route the communications session based on the customer experience score, the contact handling platform checks, at 712, whether to route based on the customer's social network influence score, and proceeds based on that check.

Reverting to 702, in some implementations, upon receiving the contact, the contact handling platform proceeds to 712 and first checks whether to route the communications session based on the customer's social network influence score. For example, the ARM 136 checks whether the content provider has configured the instruction 254 to enable priority-based routing. If the content provider has enabled priority-based routing, then the ARM 136 checks whether the content provider has selected "Social Score driven" routing using the instruction 254*b*. In such implementations, the contact handling platform routes the communications session according to either 714 or 724 based on the check perform at 712, as described below.

In greater detail, at 704 the contact handling platform checks whether to route the communications session based on the customer experience score. If a determination is made at 704 to route the communications session based on the customer experience score, then at 706 the contact handling platform computes the customer experience score using parameters configured by content provider associated with the first contact point. Examples of parameters associated with the experience score and the computation of the customer experience score based on these parameters are described in U.S. patent applications with application Ser. Nos. 14/230,586 and 14/230,792, which are incorporated herein by reference for all purposes.

Upon computing the customer experience score, at 708 the contact handling platform determines whether to route the communications session to a human agent based on the experience score. For example, as described in greater detail in the aforementioned applications, the ARM 136 compares the customer experience score to one or more predetermined threshold values for the experience score.

If the computed customer experience score is greater than the threshold value(s), then the ARM 136 decides not to route the communications session to a human agent. As noted previously, this may be the case because a value of the customer experience score greater than the threshold, i.e., a high value of the customer experience score, indicates that the customer's satisfaction level during the interaction with the automated response system, such as ARS 132, is high. In such cases, the call is handled using the automated response system at 710.

On the other hand, if the computed customer experience score is less than the threshold value(s), then the contact handling platform, i.e., the ARM 136, decides to route the communications session to a human agent. In such cases, in some implementations the communications session is routed to a human agent as described in the U.S. patent applications with application Ser. Nos. 14/230,586 and 14/230,792, which are incorporated herein by reference for all purposes. In some other implementations, the contact handling platform selects a human agent for routing the communications session based on the customer's social network influence score, as described below.

If a determination is made at 712 to route the communications session based on the customer's social network influence score, or the ARM decides at 708 to route the communications session to a human agent based on the customer experience score, then at 714 the contact handling platform looks up the customer's social network username or handle based on the customer's contact information. For example, the SNE 135 may have obtained the customer's social network username or handle during a previous communications session and stored it along with the customer's contact information, as described with respect to the process 600. At 714, the SNE 135 obtains the customer's identifying information based on the current communications session. For example, the SNE 135 obtains the customer's calling number (if the communications mode is a telephone call), or the customer's email address (if the communications mode is email messages), or the customer's account information for the interaction site (if the communications mode is web-based chat messages where the customer has logged in with a username and password to the interaction site). The SNE compares the identifying information obtained from the communications session to customers' contact information stored by the contact handling platform, e.g., in data store 138. If the identifying information matches one of the stored contact information, then the SNE retrieves the social network username/handle that is stored along with the matching contact information.

At 716, the contact handling platform computes the customer's social network influence score in real-time and/or retrieves influence score stored by the platform. For example, as described previously, the SNE 135 obtains, through APIs provided by the social network, the customer's social network data using the retrieved social network username. The SNE 135 analyzes the obtained data and measures values of various social network parameters 208 that are configured by the content provider using the settings interface 206. The SNE computes a current social network influence score for the customer based on the measured parameter values.

Additionally or alternatively, in some implementations the SNE 135 retrieves previously-computed social network influence scores for the customer. As described previously, the customer's social network influence score(s) may be computed during earlier communications sessions with the customer, and stored by the contact handling platform.

Using previously-computed social network influence scores may be useful, for example, when the SNE 135 is unable to obtain the customer's current social network data using the APIs provided by the social network website (e.g., when the website is down, or the APIs are blocked, or some other suitable reason).

At 718, the contact handling platform selects an agent or prioritizes the communications session in a session queue based on the influence score. For example, the ARM 136 compares the customer's social network influence score to a predetermined threshold value. The ARM 136 may compare the social network influence score that is computed for the current communications session, or compare previously-computed social network influence score, or some suitable combination of both.

As described previously, a value of the influence score higher than the threshold value may indicate a high impact of the customer's social media posts. The ARM 136 may assign a more experienced agent to handle a customer communications session for a customer who has a social network influence score higher than the threshold value. Conversely, the ARM 136 may assign a less experienced agent to handle a customer communications session for a customer who has a social network influence score lower than the threshold value. However, in some other implementations, the reverse may be true, i.e., the ARM may assign a more experienced agent to handle a customer communications session corresponding to a customer social network influence score lower than the threshold value, but assign a less experienced agent to handle a customer communications session corresponding to a customer social network influence score higher than the threshold value.

Also as noted previously, situations may arise when no suitable agents are available to handle immediately the customer communications sessions that are being routed to the agents. In such cases, the ARM 136 may place the customer communications session in a session queue, which includes communications sessions that are waiting for agents to be available. The ARM 136 may place the communications session in the session queue based on the customer's social network influence score. For example, the communications sessions waiting in the queue may be ordered based on descending values of corresponding customers' social network influence scores from the head of the queue. Accordingly, communications sessions with higher customer social network influence score may be routed to agents earlier than communications sessions with lower customer social network influence scores, even if the latter may have been placed in the queue earlier.

In some other implementations, the reverse may be true, i.e., the ARM may order the communications sessions waiting in the queue based on ascending values of corresponding customers' social network influence scores from the head of the queue. Accordingly, communications sessions with lower customer social network influence scores may be placed ahead in the queue compared to sessions with higher customer social network influence scores. Consequently, the sessions corresponding to lower social network influence scores may be routed to agents earlier than communications sessions with higher customer social network influence scores, when agents become available to handle the sessions.

In some implementations, the ARM 136 may compare a customer's social network influence score to a threshold value to determine whether to place the communications sessions in the session queue. For example, when agents are not available for handling a communications session immediately, the ARM may place the communications session in the session queue if the associated customer's social network influence score is higher than the threshold value. But the ARM may reroute the communications session for handling by the ARS 132 the associated customer's social network influence score is lower than the threshold value. In some implementations, the reverse may be true.

In some implementations, a social network influence score may be compared to different threshold values to determine whether to route the associated communications session to a human agent, and whether to place the communications session in the session queue when agents are not available to handle the session immediately. For example, the ARM 136 may compare the customer's social network influence score to a first threshold value to initially determine whether to route the associated communications session to a human agent or to an automated response system. The ARM may decide to route the communications session to a human agent based on comparing to the first threshold value (e.g., when the social network influence score is higher than the first threshold value). However, if no agents are available to handle the call immediately, the ARM may compare the customer's social network influence score to a second threshold value to determine whether to place the associated communications session in the session queue, or to determine the position of the associated communications session in the session queue. The first threshold value, or the second threshold value, or both, may be configured by the content provider, or they may be predetermined by the contact handling platform. In some implementations, the first threshold value may be higher than the second threshold value, while in other implementations the reverse may be true.

At 720, the contact handling platform routes the communications session to a human agent. The agent may be the one selected at 718 based on the customer's social network influence score. Alternatively, the agent may be the first suitable agent who becomes available when the particular communications session is at the head of the queue. In this manner as described in the preceding sections, the contact handling platform may route customer communications sessions to suitable human agents based on the customer's social network influence score, or the customer experience score, or both.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

An "engine" (or "software engine") may refer to software-implemented input/output system that provides an output that is different from the input. An engine can be an encoded block of functionality, such as a software library, a software platform, a Software Development Kit ("SDK"), a software module, or a compiled object.

In some implementations, the terms "engine," "module" and "system" may be used synonymously to refer to the same object. Such an object also may include hardware components. In some implementations, the software functionality may be embedded in the hardware components.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method comprising:
receiving, at a call handling platform, a call placed by a caller to a calling number;
examining, by the call handling platform, parameters of the call;
determining, by the call handling platform, identifying information of the caller based on examining the parameters of the call;
matching, by the call handling platform, the identifying information of the caller with a social network username corresponding to a social media network;
obtaining, by the call handling platform and from the social media network, social network data associated with the caller using the social network username;
analyzing, by the call handling platform, the social network data;
in response to analyzing the social network data, measuring, by the call handling platform, values of one or more social network parameters that are configured with first weights by a first content provider associated with the calling number, the first weights of the one or more social network parameters being distinct from second weights of the one or more social network parameters that are configured by a second content provider different from the first content provider, wherein the first weights and the second weights of the one or more social network parameters are concurrently stored in a storage medium associated with the call handling platform;
computing, by the call handling platform, a social network influence score for the caller using the values of the one or more social network parameters that are configured with the first weights, wherein the social network influence score reflects a numerical measure of a level of impact of activity of the caller in the social media network;
accessing, by the call handling platform, a predetermined influence score threshold value;
comparing, by the call handling platform, the social network influence score to the influence score threshold value;
conditioned on determining, by the call handling platform and based on the comparing, that the social network influence score for the caller indicates that the activity of the caller in the social media network has a high level of impact, selecting a first human agent at a call center; and
routing, by the call handling platform, the call to the first human agent at the call center.

2. The method of claim 1, further comprising:
obtaining a list of human agents available at the call center for handling the call;
determining one or more characteristics of the human agents; and
selecting the first human agent for routing the call based on the determined characteristics of the human agents and the social network influence score of the caller.

3. The method of claim 1, further comprising:
determining that a human agent is not available at present to handle the call; and
in response to the determining, placing the call in a call waiting queue, wherein an order of calls placed in the call waiting queue are based on social network influence scores of associated callers.

4. The method of claim 1, wherein the one or more social network parameters are configured by the first content provider using a graphical user interface (GUI) provided by the call handling platform, the method further comprising:
assigning the first weights to the one or more social network parameters, wherein the first weights are configured by the first content provider; and
computing the social network influence score based on the values of the one or more social network parameters weighted using the first weights.

5. The method of claim 1, wherein receiving the call placed by the caller comprises:
initially routing the call to an interactive voice response (IVR) module associated with the call handling platform;
collecting data points based on an interaction of the caller with the IVR module during the call;
computing an experience score for the caller using the data points, wherein the experience score reflects a numerical measure of a level of satisfaction of the caller in interacting with the IVR module during the call;
accessing a predetermined experience score threshold value that indicates a first level of caller satisfaction;
comparing the experience score to the experience score threshold value; and
conditioned on determining, based on the comparing, that the experience score for the caller indicates that the caller has a lower level of satisfaction than the first level of satisfaction, deciding to route the call to a human agent at the call center.

6. The method of claim 1, further comprising:
determining whether an option for recording a call is enabled; and
based on determining that the option for recording a call is enabled, initiating recording of interaction between the caller and the first human agent.

7. The method of claim 1, wherein determining that the social network influence score for the caller indicates that the activity of the caller in the social media network has a high level of impact comprises determining that the social network influence score for the caller is greater than the influence score threshold value.

8. The method of claim 1, wherein the second content provider is associated with a second calling number, the method comprising:
receiving, at the call handling platform, a second call placed by a second caller to the second calling number;
examining, by the call handling platform, parameters of the second call;
determining, by the call handling platform, identifying information of the second caller based on examining the parameters of the second call;
matching, by the call handling platform, the identifying information of the second caller with a second social network username corresponding to the social media network;
obtaining, by the call handling platform and from the social media network, second social network data associated with the second caller using the second social network username;
analyzing, by the call handling platform, the second social network data;
in response to analyzing the second social network data, measuring, by the call handling platform, values of the one or more social network parameters that are configured with the second weights by the second content provider;
computing, by the call handling platform, a second social network influence score for the second caller using the values of the one or more social network parameters that are configured with the second weights, wherein the second social network influence score reflects a numerical measure of a level of impact of activity of the second caller in the social media network;
accessing, by the call handling platform, a predetermined second influence score threshold value;
comparing, by the call handling platform, the second social network influence score to the second influence score threshold value;
conditioned on determining, by the call handling platform and based on the comparing, that the second social network influence score for the second caller indicates that the activity of the second caller in the social media network has a high level of impact, selecting a second human agent at a call center; and
routing, by the call handling platform, the second call to the second human agent at the call center.

9. A system comprising:
a call handling platform that includes a processor and instructions stored in a machine-readable medium that, when executed by the processor, are configured to cause the processor to perform operations comprising:
receiving, at the call handling platform, a call placed by a caller to a calling number;
examining, by the call handling platform, parameters of the call;
determining, by the call handling platform, identifying information of the caller based on examining the parameters of the call;
matching, by the call handling platform, the identifying information of the caller with a social network username corresponding to a social media network;
obtaining, by the call handling platform and from the social media network, social network data associated with the caller using the social network username;
analyzing, by the call handling platform, the social network data;
in response to analyzing the social network data, measuring, by the call handling platform, values of one or more social network parameters that are configured with first weights by a first content provider associated with the calling number, the first weights of the one or more social network parameters being distinct from second weights of the one or more social network parameters that are configured by a second content provider different from the first content provider, wherein the first weights and the second weights of the one or more social network parameters are concurrently stored in a storage medium associated with the call handling platform;
computing, by the call handling platform, a social network influence score for the caller using the values of the one or more social network parameters that are configured with the first weights, wherein the social network influence score reflects a numerical measure of a level of impact of activity of the caller in the social media network;
accessing a predetermined influence score threshold value;
comparing the social network influence score to the influence score threshold value;
conditioned on determining, by the call handling platform and based on the comparing, that the social network influence score for the caller indicates that the activity of the caller in the social media network has a high level of impact, selecting a first human agent at a call center; and
routing the call to the first human agent at the call center.

10. The system of claim 9, wherein the instructions are configured to cause the processor to perform operations further comprising:
obtaining a list of human agents available at the call center for handling the call;
determining one or more characteristics of the human agents; and
selecting a first human agent for routing the call based on the determined characteristics of the human agents and the social network influence score of the caller.

11. The system of claim 9, wherein the instructions are configured to cause the processor to perform operations further comprising:
determining that a human agent is not available at present to handle the call; and
in response to the determining, placing the call in a call waiting queue, wherein an order of calls placed in the call waiting queue are based on social network influence scores of associated callers.

12. The system of claim 9, wherein the one or more social network parameters are configured by the first content provider using a graphical user interface (GUI) provided by the call handling platform, and wherein the instructions are configured to cause the processor to perform operations further comprising:
assigning the first weights to the one or more social network parameters, wherein the first weights are configured by the first content provider; and
computing the social network influence score based on the values of the one or more social network parameters weighted using the first weights.

13. The system of claim 9, wherein an interactive voice response (IVR) module is associated with the call handling platform, and wherein receiving the call placed by the caller comprises:
- initially routing the call to the IVR module;
- collecting data points based on an interaction of the caller with the IVR module during the call;
- computing, by the call handling platform, an experience score for the caller using the data points, wherein the experience score reflects a numerical measure of a level of satisfaction of the caller in interacting with the IVR module during the call;
- accessing a predetermined experience score threshold value that indicates a first level of caller satisfaction;
- comparing the experience score to the experience score threshold value; and
- conditioned on determining, based on the comparing, that the experience score for the caller indicates that the caller has a lower level of satisfaction than the first level of satisfaction, deciding to route the call to a human agent at the call center.

14. The system of claim 9, wherein the instructions are configured to cause the processor to perform operations further comprising:
- determining whether an option for recording a call is enabled; and
- based on determining that the option for recording a call is enabled, initiating recording of interaction between the caller and the first human agent.

15. The system of claim 9, wherein determining that the social network influence score for the caller indicates that the activity of the caller in the social media network has a high level of impact comprises determining that the social network influence score for the caller is greater than the influence score threshold value.

16. The system of claim 9, wherein the second content provider is associated with a second calling number, and wherein the instructions are configured to cause the processor to perform operations further comprising:
- receiving, at the call handling platform, a second call placed by a second caller to the second calling number;
- examining, by the call handling platform, parameters of the second call;
- determining, by the call handling platform, identifying information of the second caller based on examining the parameters of the second call;
- matching, by the call handling platform, the identifying information of the second caller with a second social network username corresponding to the social media network;
- obtaining, by the call handling platform and from the social media network, second social network data associated with the second caller using the second social network username;
- analyzing, by the call handling platform, the second social network data;
- in response to analyzing the second social network data, measuring, by the call handling platform, values of the one or more social network parameters that are configured with the second weights by the second content provider;
- computing, by the call handling platform, a second social network influence score for the second caller using the values of the one or more social network parameters that are configured with the second weights, wherein the second social network influence score reflects a numerical measure of a level of impact of activity of the second caller in the social media network;
- accessing, by the call handling platform, a predetermined second influence score threshold value;
- comparing, by the call handling platform, the second social network influence score to the second influence score threshold value;
- conditioned on determining, by the call handling platform and based on the comparing, that the second social network influence score for the second caller indicates that the activity of the second caller in the social media network has a high level of impact, selecting a second human agent at a call center; and
- routing, by the call handling platform, the second call to the second human agent at the call center.

* * * * *